US009775183B2

(12) United States Patent
Miklós et al.

(10) Patent No.: US 9,775,183 B2
(45) Date of Patent: Sep. 26, 2017

(54) RADIO COMMUNICATION SYSTEM FOR ASSIGNING A SHORT-LIVED C-RNTI

(75) Inventors: György Miklós, Pilisborosjenö (HU); Erik Eriksson, Linköping (SE); Johan Rune, Lidingö (SE); Joachim Sachs, Sollentuna (SE); Zoltán Turányi, Szentendre (HU); Niclas Wiberg, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 166 days.

(21) Appl. No.: 14/370,162

(22) PCT Filed: Jan. 3, 2012

(86) PCT No.: PCT/EP2012/050041
§ 371 (c)(1),
(2), (4) Date: Jul. 1, 2014

(87) PCT Pub. No.: WO2013/102489
PCT Pub. Date: Jul. 11, 2013

(65) Prior Publication Data
US 2015/0043455 A1   Feb. 12, 2015

(51) Int. Cl.
*H04W 76/02* (2009.01)
*H04W 8/26* (2009.01)
(Continued)

(52) U.S. Cl.
CPC ........... *H04W 76/021* (2013.01); *H04W 8/26* (2013.01); *H04W 72/042* (2013.01); *H04W 74/0833* (2013.01)

(58) Field of Classification Search
None
See application file for complete search history.

(56) References Cited

U.S. PATENT DOCUMENTS 6,275,706 B1 *   8/2001   Rune ............... H04W 8/26
                                          455/443
2004/0180675 A1 *  9/2004  Choi ............... H04L 12/1877
                                          455/458
(Continued)

FOREIGN PATENT DOCUMENTS

EP           2 088 825 A1     8/2009
WO      WO 2007/052968 A1     5/2007
(Continued)

OTHER PUBLICATIONS

International Search Report, PCT Application No. PCT/EP2012/050041, dated Sep. 28, 2012.
(Continued)

*Primary Examiner* — Jeffrey M Rutkowski
*Assistant Examiner* — Andre Tacdiran
(74) *Attorney, Agent, or Firm* — Sage Patent Group

(57) ABSTRACT

A radio communication system and a method for assigning a short-lived Cell Radio Network Temporary Identifier, "CRNTI", to a first user equipment performing random access to a radio network node are provided. The radio communication system registers the first user equipment as connected to the radio network node. A message for synchronizing the radio network node and the first user equipment with respect to the first time period is transferred. After the first time period has elapsed, the radio communication system maintains the first user equipment connected to the radio network node, and allows the short-lived CRNTI to be assigned to a second user equipment.

24 Claims, 5 Drawing Sheets

(51) Int. Cl.
*H04W 72/04* (2009.01)
*H04W 74/08* (2009.01)

(56) References Cited

U.S. PATENT DOCUMENTS

| | | | | |
|---|---|---|---|---|
| 2007/0218901 | A1* | 9/2007 | Tenny | H04L 29/12254 455/436 |
| 2007/0259675 | A1* | 11/2007 | Worrall | H04W 68/00 455/458 |
| 2010/0118834 | A1* | 5/2010 | Kalhan | H04W 48/08 370/336 |
| 2010/0215011 | A1* | 8/2010 | Pan | H04L 5/0064 370/329 |
| 2010/0232373 | A1* | 9/2010 | Nory | H04W 72/1289 370/329 |
| 2010/0238909 | A1* | 9/2010 | Kim | H04W 8/26 370/336 |
| 2010/0260140 | A1* | 10/2010 | Zhu | H04W 36/0005 370/331 |
| 2010/0323736 | A1 | 12/2010 | Fischer et al. | |
| 2011/0124360 | A1* | 5/2011 | Sagfors | H04W 28/18 455/509 |
| 2011/0249633 | A1* | 10/2011 | Hong | H04L 5/0053 370/329 |
| 2012/0087318 | A1* | 4/2012 | Liu | H04W 16/04 370/329 |
| 2012/0094699 | A1* | 4/2012 | Tamura | H04W 48/12 455/458 |
| 2012/0106494 | A1* | 5/2012 | Moulsley | H04L 5/0091 370/329 |
| 2012/0134352 | A1* | 5/2012 | Vu | H04L 61/2053 370/347 |
| 2012/0269108 | A1* | 10/2012 | Zhai | H04W 72/005 370/312 |
| 2012/0275366 | A1* | 11/2012 | Anderson | H04W 52/0219 370/311 |
| 2012/0281566 | A1* | 11/2012 | Pelletier | H04W 76/046 370/252 |
| 2013/0003533 | A1* | 1/2013 | Barbieri | H04W 36/06 370/225 |
| 2013/0039188 | A1* | 2/2013 | Larsson | H04L 5/0053 370/241 |
| 2013/0058317 | A1* | 3/2013 | Park | H04L 5/0092 370/336 |
| 2013/0107825 | A1* | 5/2013 | Cherian | H04W 76/021 370/329 |
| 2013/0163537 | A1* | 6/2013 | Anderson | H04W 72/1284 370/329 |
| 2013/0176952 | A1* | 7/2013 | Shin | H04L 5/001 370/329 |
| 2014/0004857 | A1* | 1/2014 | Rune | H04W 48/12 455/434 |
| 2014/0038647 | A1* | 2/2014 | Zhang | H04W 68/005 455/458 |
| 2014/0105164 | A1* | 4/2014 | Moulsley | H04W 72/042 370/329 |
| 2014/0112252 | A1* | 4/2014 | Hoymann | H04L 5/0053 370/328 |
| 2014/0169353 | A1* | 6/2014 | Savolainen | H04L 61/2007 370/338 |

FOREIGN PATENT DOCUMENTS

| | | | |
|---|---|---|---|
| WO | WO2007052968 | * | 5/2007 |
| WO | WO 2012/044211 A1 | | 4/2012 |

OTHER PUBLICATIONS

Written Opinion of the International Searching Authority, PCT Application No. PCT/EP2012/050041, dated Sep. 28, 2012.
Kaaranen, Heikki. "10.1.1. Paging." *UMTS Networks: Architecture, Mobility, and Services*. Chichester: J. Wiley, Jan. 1, 2001. 267-68. Print.
3GPP, Technical Specification—"Universal Mobile Telecommunications System (UMTS); Radio Resource Control (RRC); Protocol Specification (Release 12)", 3GPP TS 25.331 V12.7.0 (Oct. 2015), 2287 pp.

* cited by examiner

RADIO COMMUNICATION SYSTEM FOR ASSIGNING A SHORT-LIVED C-RNTI

CROSS REFERENCE TO RELATED APPLICATION

This application is a 35 U.S.C. §371 national stage application of PCT International Application No. PCT/EP2012/050041, filed on 3 Jan. 2012, the disclosure and content of which is incorporated by reference herein in its entirety. The above-referenced PCT International Application was published in the English language as International Publication No. WO 2013/102489 A1 on 11 Jul. 2013.

TECHNICAL FIELD

The invention herein relates to telecommunication systems. In particular, the invention herein relates to methods and network nodes in a radio communication system for assigning a short-lived Cell Radio Network Temporary Identifier to a first user equipment. Moreover, embodiments of the invention herein relate to a radio network node for assigning a short-lived Cell Radio Network Temporary Identifier to a first user equipment, and to a first user equipment for enabling assignment of a short-lived Cell Radio Network Temporary Identifier to the first user equipment.

BACKGROUND

In recent years, it has become more and more common to use cellular radio communication systems for automatic exchange of information between devices for performing many different tasks, such as opening and closing of valves in for example a sewage system, measuring of temperature or pressure, updating of map information for a Global Positioning System (GPS-system) in a car and more. This kind of automated communication without user interaction is often referred to as machine-to-machine (M2M) communication. Typically, these autonomous devices transmit or receive only small amounts of data, more or less infrequently, such as one per week to once per minute. According to $3^{rd}$ Generation Partnership Project (3GPP) standardization terminology, these devices are often referred to as machine type communication devices (MTC devices). Sometimes MTC devices are denoted machine devices (MDs) in the literature. In the context of this document MTC devices are able to communicate with and via a cellular network. As such, an MTC device may also be referred to as a mobile terminal, or, using a well established 3GPP term, user equipment (UE). An MTC device may thus be seen as a special type of UE and in this document MTC devices will sometimes be referred to as MTC devices and sometimes as UEs. As more and more devices, such as laptops, digital cameras, cars, outdoor thermometers, indoor thermometers, electricity meters and so on, become connected, the number of connections in the radio communication systems will increase drastically.

With the nature of MTC devices and their assumed typical uses follow that they will often have to be very power efficient, since external power supplies will often not be available and since it is neither practically nor economically feasible to frequently replace or recharge their batteries.

One possible means to achieve low energy consumption in MTC devices is to use long active/connected mode Discontinuous Reception (DRX) cycles with long inactive/sleep periods. The Discontinuous Reception (DRX) procedure, defined as a part of the LTE Medium Access Control (MAC), specifies time periods during which a communication device is obliged to monitor the Physical Downlink Control Channel (PDCCH). In DRX, an active time is defined for this purpose. In time periods, specified as active time, the communication device is not allowed to go to a sleep state. For simplicity, time other than active time is referred to as sleep time even though the user equipment (UE) is not required to go to the sleep state. However, since the UE consumes less power in the sleep state than in the active time, it is beneficial to enter the sleep state. Active time is calculated based on specific DRX timers and cycles in such a way that the network and the communication device have a similar understanding of when it is possible to schedule the communication device.

When the UE remains in connected mode DRX with long (i.e. longer than typically used for regular UEs) DRX cycles, a long active/connected mode DRX is said to be used. The evolved radio network node of an LTE network (eNB) maintains a context (i.e. state information) for a UE in long active/connected mode DRX, even during the sleep periods. In contrast, a UE in idle mode DRX is in idle mode during both sleep periods and active/listening periods and the eNB thus has no context for the UE.

Therefore, when using the long active/connected mode DRX procedure the MTC devices is allowed to remain in connected mode and still spend most of their time in an energy-efficient sleep mode. An advantage that connected mode DRX has over the idle mode DRX is that the MTC device does not have to go through idle-to-connected mode transition before transmitting or receiving data. This saves signaling overhead and thus both radio resources and battery.

In 3GPP Long Term Evolution (LTE), all scheduling assignments, grants and commands are issued to specific Radio Network Temporary Identifiers (RNTI) on the Physical Downlink Control Channel (PDCCH). The RNTI is a number between 0 and $2^{16}-1$. Different types of RNTIs exist, such as the Paging RNTI (P-RNTI), System Information RNTI (SI-RNTI), etc. For example, a communication device (or user equipment, "UE") that is reading e.g. System Information is looking for the commands assigned to the SI-RNTI on the PDCCH. RNTIs can either be common to several communication devices, or unique to one specific communication device. Scheduling assignments and grants are sent to the user equipment by means of downlink control information (DCI) messages which are encoded with a RNTI, such as C-RNTI, on the PDCCH.

Specifically, the Cell RNTI (C-RNTI) is used to address a specific communication device in a connected state, such as RRC_CONNECTED state in case of an LTE system. A communication device in RRC_CONNECTED state has established a connection to a cellular radio communication network. Therefore, the communication device in RRC_CONNECTED state needs at least one C-RNTI that is unique among the C-RNTIs assigned to other communication devices in RRC_CONNECTED state in the same cell. Multiple RNTIs may be allocated to a communication device at the same time, i.e. in parallel. For example, a Semi-Persistent Scheduling RNTI (SPS-RNTI) may be assigned to a communication device in addition to the aforementioned C-RNTI.

However, the C-RNTI is not explicitly included in the Downlink Control Information (DCI). Instead, it is implicitly included in a Cyclic Redundancy Check (CRC) value attached to a DCI payload. First the CRC is calculated and then the RNTI is added (bitwise modulo 2) to the CRC before the block is coded, modulated and transmitted. The receiver may use the following procedure: Calculate a CRC on the received payload and then subtract it from the received, modified CRC. The result of the subtraction is, provided that no bit errors have slipped through, the encoded RNTI, which may then be compared with any applicable RNTI in search of a match.

Moreover, PDCCH signaling may be transmitted on several sets of resources using different formats and schemes for coding and rate matching. A resource is defined by a range in time and frequency in a time-frequency grid of LTE.

This forces a UE/MTC device monitoring the PDCCH to blindly decode multiple different PDCCH formats on multiple different sets of resources in search of correctly decoded message addressed to one of the RNTIs (e.g. the C-RNTI) allocated to the UE/MTC device. To limit the complexity of the UEs/MTC devices the sets of resources that the eNB may transmit the PDCCH signaling on is restricted by certain rules. First, resource elements that may be used for PDCCH signaling are grouped into so-called Control Channel Elements (CCEs). Secondly, only certain combinations of CCEs are allowed. To further limit the number of resource element combinations that a UE/MTC device has to search for relevant PDCCH signaling, UE/MTC device specific, further restricted combinations of CCEs are introduced. Such a UE/MTC device specific combination of CCEs is referred to as a search space. A UE/MTC device specific search space is derived from the C-RNTI in combination with the subframe number. In addition to the UE/MTC device specific search spaces there are common search spaces, which are searched by all UEs/MTC devices and which are used for signaling with multiple receivers, e.g. scheduling assignment for system information transmissions. UE/MTC device specific search spaces may often overlap each other, which means that a UE/MTC device may sometimes be blocked from PDCCH signaling in a subframe, if the CCEs in its search space are already used for PDCCH signaling to other UEs/MTC devices with overlapping search spaces.

The RNTIs in current LTE network are signaled by 16 bits, meaning that $2^{16}=65\,536$ values are possible. However, in practice, it can be speculated that if allocations of RNTIs are very closely in the RNTI space (in terms of the Hamming distance), this would lead to a high probability of RNTI misdetection. If this is the case, it is possible that only a fraction of the current RNTI number space can be utilized in practice.

The following problems make the C-RNTI values limited:
all Radio Resource Control (RRC) connections need at least one RNTI, i.e. the C-RNTI,
only one connection can be identified with one C-RNTI, and
some connections may require multiple RNTIs.

Furthermore, as explained above, not all RNTI values are available for C-RNTI use, but only a subset (albeit a large one) is actually allocated for C-RNTIs.

Consider the following scenario. It is assumed that data becomes available for transmission in the communication device, but the communication device does not have uplink (UL) resources to transmit the data, even when the communication device is in the RRC_CONNECTED state. Thus, the communication device sends a Scheduling Request (SR) to requests resources from a radio network node, such as an eNB, provided that the communication device has been allocated Physical Uplink Control Channel (PUCCH) resources for transmission of the SR. If no PUCCH resources for SR transmissions are assigned to the communication device, the communication device initiates a Random Access (RA) procedure. In a contention based RA, the communication device selects a random preamble to be transmitted on a Random Access Channel (RACH). For this case, the RA procedure is as follow:

The communication device transmits a random preamble selected by it on RACH (as noted above).

The radio network node responds with a RA Response (RAR) for the same preamble as transmitted by the communication device. RAR message includes a Scheduling Grant (SG) for an UL transmission, also known as "UL grant" or "Random Access Response Grant".

The communication device now responds to the RAR with a scheduled message 3 (as known from 3GPP-terminology) including a C-RNTI thus identifying the communication device.

The radio network node then replies with a Contention Resolution message. If the Contention Resolution message includes the same C-RNTI as the communication device has transmitted in message 3, the communication device regards the Random Access Procedure as successful.

As mentioned above, the RA Response contains an UL grant. In conjunction with the RA procedure the radio network node also has the possibility to allocate uplink signaling resources on the PUCCH, which the communication devices may use to request further uplink transmission resources from the radio network node. The communication device may also send a scheduling request together with any uplink transmission on the PUSCH, e.g. the uplink transmission using the resources assigned by the UL grant in the RA Response.

The above described method is contention based, because two communication devices can request resources at the same time with the same preamble. In this case the radio network indicates by means of C-RNTI in Contention Resolution message which of the communication device succeeds with the random access.

As the number of connections, due to for example automated communication from communication devices in the radio networks increases, it is possible that the current number of usable RNTI values is not enough to cater for all the devices in a cell simultaneously. An example where this may happen is a dense sensor network including a huge amount of temperature/pressure/humidity sensors. In addition, there may be other user equipments, such as cellular phones, in the same cell as the sensors. These user equipments may also be connected and, hence, consume (or occupy) a C-RNTI each. Thus, each communication device requires a C-RNTI that is unique in the cell.

When the RNTI space is exhausted, the network needs to drop connections of some devices to allow for other devices to connect instead. Switching frequently between connected state and idle state increases the amount of signaling messages, overhead and also battery consumption. For small devices having only very limited battery, this is not desirable.

Looking primarily from a 3GPP Evolved Packet System (EPS) perspective, there are problems associated with the existing technology. Although staying in idle mode during inactivity and using long paging DRX cycles is efficient, it requires the MTC device to go through the RRC connection (and EPS bearer) establishment procedure, i.e. the idle-to-connected mode transition, every time it needs to transmit or receive some data. This causes a lot of signaling overhead and also consumes energy in the MTC device.

The connected mode DRX eliminates the need for idle-to-connected mode transition, but it has other disadvantages. One disadvantage is that in mass deployment scenarios a cell may run out of C-RNTIs, because of the potentially large number of devices that are kept in connected mode simultaneously. This is due to the limited 16-bit length of the C-RNTI which is sufficient for traditional UEs but may be too limited for massive amounts of machine devices.

SUMMARY

An object is to enable large amounts of communication devices, such as user equipments or MTC devices, to be connected to a radio network node.

According to an aspect, the object is achieved by a method in a radio communication system for assigning a short-lived C-RNTI to a first user equipment performing random access to a radio network node. The radio communication system registers the first user equipment as connected to the radio network node. In this manner, the short-lived C-RNTI is assigned to the first user equipment for identification thereof during a first time period. Next, a message for synchronizing the radio network node and the first user equipment with respect to the first time period is transferred from the radio network node to the first user equipment. After the first time period has elapsed, the first user equipment is maintained connected to the radio network node. Furthermore, the radio communication system allows the short-lived C-RNTI to be assigned to a second user equipment. Thereby, the radio communication system enables use of the short-lived C-RNTI for identification of the second user equipment when the second user equipment is connected to the radio network node.

According to another aspect, the object is achieved by a first user equipment for enabling assignment of a short-lived C-RNTI to the first user equipment performing random access to a radio network node. The first user equipment comprises a processing circuit adapted to register the first user equipment as connected to the radio network node. The short-lived C-RNTI is assignable to the first user equipment for identification thereof during a first time period. Furthermore, the processing circuit further is adapted to maintain the first user equipment connected to the radio network node after the first time period has elapsed, and to refrain from considering the short-lived C-RNIT as assigned to the user equipment after the first time period has elapsed, thereby enabling use of the short-lived C-RNTI for identification of the second user equipment when connected to the radio network node. The first user equipment also comprises a receiver adapted to receive, from the radio network node, a message for synchronizing the radio network node and the first user equipment with respect to the first time period.

According to a further aspect, the object is achieved by a radio network node for assigning a short-lived C-RNTI to a first user equipment performing random access to the radio network node. The radio network node comprises a processing circuit adapted to register the first user equipment as connected to the radio network node. The short-lived C-RNTI is assignable to the first user equipment for identification thereof during a first time period. Furthermore, the processing circuit further is adapted to maintain the first user equipment connected to the radio network node after the first time period has elapsed, and to allow the short-lived C-RNTI to be assigned to a second user equipment after the first time period has elapsed, thereby enabling use of the short-lived C-RNTI for identification of the second user equipment when connected to the radio network node. The radio network node also comprises a transmitter adapted to send, to the first user equipment, a message for synchronizing the radio network node and the first user equipment with respect to the first time period.

According to a still further aspect, the object is achieved by a radio communication system for assigning a short-lived C-RNTI to a first user equipment performing random access to a radio network node, wherein the radio communication system comprises the first user equipment adapted according to embodiments herein and the radio network node adapted according to embodiments herein.

Since the first user equipment is maintained connected to the radio network node after the first time period has elapsed and that the second user equipment is allowed to be connected to the radio network node after the first time period has elapsed, the first user equipment may remain connected to the radio network node without restricting the second user equipment's possibility to connect to the radio network node. In this manner, the short-lived C-RNTI is allowed to be reused after the first time period has elapsed, typically the first time period is short, such as a few seconds, tens of seconds, a couple of minutes or the like. The first time period may be indicative time elapsed since last dedicated transmission (in either direction) between the first user equipment and the radio network node. Thanks to that the short-lived C-RNTI is allowed to be reused, the second user equipment may become connected to the radio network node by performing random access and may be assigned the short-lived C-RNTI for identification the second user equipment. As a result, large amounts of communication devices, such as user equipments or MTC devices, are connectable to a radio network node.

Advantageously, in scenarios where the number of available C-RNTIs is small, user equipments will not be disallowed to connect to the radio network node due to that there is no available C-RNTI. Instead, an available short-lived C-RNTI will be assigned to the user equipment for a short period, given by the first time period.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
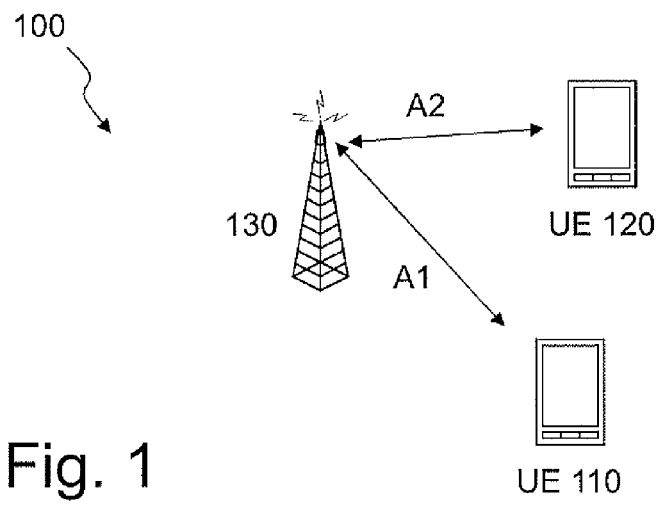
FIG. 1 shows a schematic overview of an exemplifying radio communication system in which exemplifying methods according to embodiments herein may be implemented.

Throughout the following description similar reference numerals have been used to denote similar elements, network nodes, parts, items or features, when applicable. In the Figures, features that appear in some embodiments are indicated by dashed lines.

FIG. 1 depicts a radio communication system 100, such as a wireless communications system in which embodiments herein may be implemented. The radio communication system 100 is a cellular communication system, which may be based on an orthogonal frequency-division multiplexing (OFDM) based radio communication system like the Long Term Evolution system (LTE). In other examples, the radio communication system 100 may be based on a Wideband Code Division Multiple Access (WCDMA) or a High Speed Packet Access (HSPA) of a Universal Mobile Telecommunications System (UMTS).

The radio communication system 100 comprises a first user equipment 110, a second user equipment 120 and a radio network node 130, such as a radio base station, a NodeB, an evolved NodeB (eNB), a Radio Network Controller (RNC) or the like. The radio network node 130 may serve the user equipments 110, 120. The user equipments 110, 120 may also be referred to as users or, when applicable, MTC devices. The radio network node 130 may operate one or more cell(s) (not shown).

The first user equipment 110 may be located in one of the cell(s) of the radio network node 130. The user equipment 120 is in some figures referred to as UE 110 and is configured to be able to communicate with the radio network node 130 over a radio link indicated by arrow A1.

The second user equipment 120 may be located in the cell of the radio network node 130 (i.e. the same cell as the first user equipment 110). The second user equipment 120 is in some figures referred to as UE 120 and is configured to be able to communicate with the radio network node 130 over a radio link indicated by arrow A2.

As used herein, the term "user equipment" may refer to a mobile phone or terminal, a cellular phone, a Personal Digital Assistant (PDA) equipped with radio communication capabilities, a smartphone, a tablet computer, a laptop equipped with an internal or external mobile broadband modem, a portable electronic radio communication device, an MTC device or the like.

In preferred embodiments, the first user equipment 110 and the second user equipment 120 are machine type communication devices (MTC devices).

The arrow A1 indicates that the first user equipment 110 and the radio network node 130 are configured for communication with each other over a radio interface, such as Universal Terrestrial Radio Access Network (UTRAN), evolved UTRAN (E-UTRAN) or the like.

The arrow A2 indicates that the second user equipment 120 and the radio network node 130 are configured for communication with each other over a radio interface, such as E-UTRAN, UTRAN or the like.

Now a simplified description of an exemplifying method in the radio communication system 100 will follow. A more detailed description will be provided with reference to FIG. 3.

As an example, the first user equipment 110 performs random access to the radio network node 130. As a result thereof, the first user equipment 110 is registered as connected, such as RRC_CONNECTED according to 3GPP terminology, while being assigned a short-lived C-RNTI. The short-lived C-RNTI may be dedicated in that it is only allowed to remain assigned for a short period of time if inactive, i.e. if no dedicated (i.e. excluding broadcast messages such as System Information) transmissions between the first user equipment 110 and the radio network node 130 take place the short-lived C-RNTI is said to be inactive. The short period is referred to as a first time period. The short-lived C-RNTI may also be referred to as a dedicated C-RNTI, since the short-lived C-RNTI is dedicated to a specific user equipment during only a short time period as compared to regular C-RNTIs. The radio network node 130 and the first user equipment 110 are synchronized with respect to a first time period. In this manner, the first user equipment 110 and the radio network node 130 will have a common understanding of when the first time period has elapsed, i.e. a common understanding of time elapsed since the last dedicated transmission between the first user equipment 110 and the radio network node 130. The synchronization is performed since the radio network node 130 may detect that the short-lived C-RNTI has been assigned to the first user equipment 110. Hereafter, the dedicated transmissions will be referred to as transmissions for simplicity. However, it shall be understood that for example broadcast transmissions (which are not a dedicated transmission) does not trigger restart of the first time period. Therefore, the first time period may be indicative of elapsed time since the last uplink or downlink transmission between the radio network node 130 and the first user equipment 110. When the first time period has elapsed, the first user equipment 110 continues to consider itself as being connected. Because the user equipment 110 and the radio network node 130 are synchronized the user equipment 110 is however also aware of that the first time period has elapsed. In addition, when the first time period has elapsed, the radio network node 130 is allowed to assign the short-lived C-RNTI to the second user equipment 120. In a similar manner as for the first user equipment 110, the second user equipment 120 will be allowed to be connected until a second time period has elapsed due to inactivity. The second time period corresponds to the first time period regarding purpose and use, but applies to the second user equipment 120 (durations of the first and second time periods are equal). Then, a further user equipment (not shown) is allowed to be connected while being assigned the short-lived C-RNTI.

In this manner, it is advantageously provided a method which enables large amounts of user equipments to be connected in the radio communication system 100. Again, a short-lived C-RNTI, referred to as dedicated C-RNTI above, is assigned to user equipments to allow quick and efficient reuse of the short-lived C-RNTI. There may be one or more short-lived C-RNTIs, e.g. two sequences of bits may be used to denote two different short-lived C-RNTIs. With this method a user equipment is assigned a short-lived C-RNTI during the RRC connection establishment procedure in conjunction with the random access (RA) procedure, using the regular mechanisms, but in contrast to a regular C-RNTI the release of the short-lived C-RNTI may governed by an inactivity timer for keeping track of the first time period. It may here be noted that in LTE the RRC connection establishment procedure comprises RRCConnectionRequest (from user equipment to the radio network node), RRCConnectionSetup (from radio network node to user equipment) and RRCConnectionComplete (from user equipment to radio network node). After a certain period of time of inactivity, i.e. the first time period, the short-lived C-RNTI is implicitly released, while the first user equipment still remains in connected mode (C-RNTI-less connected mode) which will be described in detail later on. The C-RNTI-less connected mode is used because the both the first user equipment 110 and the radio network node 130 are aware of that the first time period for the short-lived C-RNTI has elapsed.

As an example, the first time period may be monitored by means of a timer, which should be restarted at each uplink (UL) or downlink (DL) communication event involving the first user equipment 110 (excluding non-dedicated communication such as broadcast messages e.g. broadcast of system information), e.g. triggered by a scheduling assignment on the PDCCH. The timer should be set to a time period that is short enough to avoid the depletion of the C-RNTI bit space, but still long enough not to expire between the data transmissions of a single communication session, e.g. consisting of one or a few subsequent transactions. It may also be beneficial to align the C-RNTI timer with the UL time alignment timer (also referred to as the timing advance timer), such that the C-RNTI timer typically does not expire before the UL time alignment timer (unless the UL time alignment timer is started at a very large value because the first user equipment 110 is stationary). Examples of possible timeout values (i.e. not excluding others) range from one or a few seconds to a few minutes. In some examples, there may be a first timer in the first user equipment 110 and a second timer in the radio network node 130 for monitoring of the first time period.

Throughout the present disclosure, an expressions "C-RNTI-less connected mode" will be used to refer to a user equipment being connected, such as RCC_CONNECTED, but the short-lived C-RNTI is no longer assigned to the user equipment. Expressed differently, the user equipment is no longer an exclusive owner of the C-RNTI as in prior art. Therefore, it may for simplicity be said that the C-RNTI-less connected mode is entered after the first time period has elapsed. However, the term "C-RNTI-less connected mode" is used for purposes of explanation and need hence not be implemented as a complement to RRC_CONNECTED and RRC_IDLE. Instead, it is understood that when the first time period has elapsed it is equivalent to entering the C-RNTI-less connected mode.

A consequence of the method according to the simplified description above is that when the first time period has elapsed for the first user equipment 110 and the short-lived C-RNTI thus is no longer assigned to the first user equipment 110, there is no way for the radio network node 130 to address the first user equipment 110 on the PDCCH, e.g. to assign DL transmission resources to the first user equipment 110. How to deal with this is first described for assignment of DL transmission resources and later for assignment of UL transmission resources.

For assignment of DL resources, the radio network node 130 may utilize a first extended C-RNTI (EC-RNTI) as a means for identifying the first user equipment 110 on the POOCH. The EC-RNTI may be e.g. 24 bits long and may be assigned together with the short-lived C-RNTI. Alternatively, it may be assigned when the short-lived C-RNTI times out, but that would be less efficient, since it would require more signaling. For LTE, the length in number of bits of the extended C-RNTI must be longer than the 16 bit C-RNTI used in existing systems.

As an example, the short-lived C-RNTI may be indicative of the existence of the first extended C-RNTI which is to be used, i.e, stored in the radio network node 130 and the first user equipment 110, for identification of the first user equipment 110 after the first time period has elapsed and when the first user equipment 110 is in the C-RNTI-less connected mode.

Alternatively or additionally, also for assignment of DL resources, the radio network node 130 may page the first user equipment 110. This will be explained in more detail with reference to for example Action 308 of FIG. 3.

Figure 2:
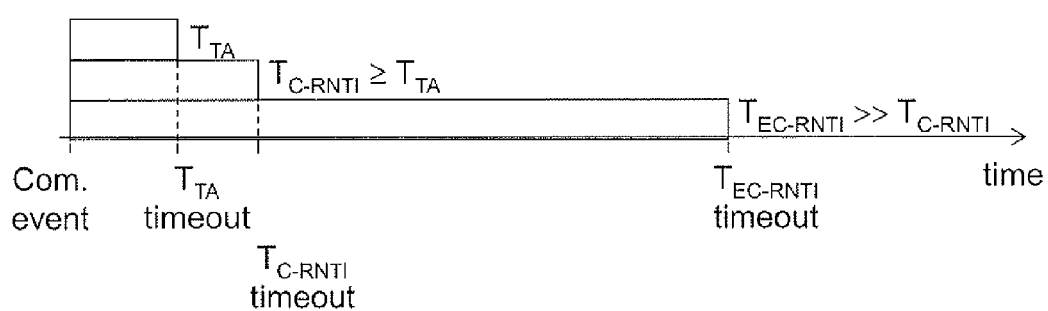
FIG. 2 shows a diagram illustrating exemplifying relations between the timeout values, such as timeout for timing advance, timeout for short-lived C-RNTI and timeout for extended C-RNTI.

Note that the EC-RNTI may be realized by the 40-bit S-TMSI (SAE Temporary Mobile Subscriber Identity, where SAE stands for Service Architecture Evolution), which is typically used to identify a user equipment during paging. However, a shorter, independent identifier may be preferred. The EC-RNTI may also be released based on an inactivity timer, although orders of magnitude greater than the inactivity timer for the short-lived C-RNTI, i.e. inactivity timer for keeping track of the first time period, or it could be allocated indefinitely (until the first user equipment 110 leaves the cell, detaches or goes to idle mode). FIG. 2 illustrates the typical relation between the timing advance timer $T_{TA}$, the dedicated, short-lived C-RNTI inactivity timer for keeping track of the first time period $T_{C-RNTI}$ and the EC-RNTI inactivity timer $T_{EC-RNTI}$ in a typical case. In this typical case, the timing advance timer $T_{TA}$ expires before the short-lived C-RNTI inactivity timer $T_{C-RNTI}$, which in turn expires before the EC-RNTI inactivity timer $T_{EC-RNTI}$.

The first user equipment 110 may also keep the EC-RNTI when it goes to idle mode and use it during a subsequent random access procedure in the same cell, in which case the radio network node 130 would have a timer based grace period before it may allocate the same EC-RNTI to the second user equipment 120 in the same cell as the first user equipment 110.

According to embodiments herein, the first extended C-RNTI, which comprises a first set of bits and a second set of bits, wherein the second set of bits is also referred to as "the additional bits", is introduced for identification of the first user equipment 110 as stated earlier. A first number of bits of the first set is equal to a second number of bits of the short-lived C-RNTI. This means that the first set has equally many bits as the short-lived C-RNTI (i.e. 16 in case of LTE), but it does not mean that each corresponding bit has the same value, i.e. 0 or 1, in the first set and in the short-lived C-RNTI. The second set comprises one or more bits. Hence, the first extended C-RNTI comprises a total number of bits being greater than the second number of bits of the short-lived C-RNTI, where the total number of bits is the sum of the first number and number of bits of the second set. In some examples, the first set of bits is equal to the short-lived C-RNTI, while in other examples, the first set is different from the short-lived C-RNTI. It shall here be noted that any portion, such as the most or least significant bits, of the first extended C-RNTI may be the first set of bits. Moreover, the first set of bits may be scattered among the bits of the first extended C-RNTI.

Although 8 additional bits, i.e. the number of bits of the second set, will be used as an example throughout the description, forming a complete EC-RNTI of 24 bits, other numbers of additional bits (and EC-RNTI lengths) are also possible. E.g. 7, 9, 10 or 16 additional bits would result in EC-RNTI lengths of 23, 25, 26 and 32 bits, respectively. It shall here also be said that the word "bit(s)" is meant to indicate an information element carrying binary information.

For convenience and simplicity, the first set of bits may be referred to as address bits and the second set of bits may be referred to as additional bits. "Additional" means here that these bits exist in addition to the number of bits of a C-RNTI.

When used for identification of the first user equipment in signaling on the PDCCH, the first extended C-RNTI may be encoded in many different manners, which all allow the first user equipment to decode/encode, implicit or explicitly, the extended C-RNTI. For example, the first set of bits may be encoded using a C-RNTI, which may be the short-lived C-RNTI or another value. In some scenarios, it may be preferred that the first set of bits is independent of, and thus typically different from, the short-lived C-RNTI. Note however that the first set of bits of an extended C-RNTI will always belong to the same number space (defined by the number of bits in the first set) as the C-RNTI number space, since the number of bits are equal in a C-RNTI and in a first set. Making the extended C-RNTI independent of the short-lived C-RNTI that is allocated to a user equipment provides greater flexibility for the radio network node to choose the extended C-RNTI that it allocates to the user equipment and this may be advantageous in some scenarios. For example, this may make it easier for the radio network node to ensure that not too many user equipments are assigned extended C-RNTIs with identical values of the bits in the first set. When a user equipment has been assigned an extended C-RNTI, it shall be configured to not only decode the first set of bits, which correspond to the bits of a C-RNTI, but also decode the second set of bits for determining whether for example a downlink transmission is intended for it.

Another way of identifying the first user equipment 110 may be to use International Mobile Subscriber Identity (IMSI), S-TMSI or the like. Normally, these values are not available to the radio network node 130, but these may be provided from a core network node managing mobility and/or subscription information. Examples of the core network node include a Mobility Management Entity (MME), an Operation and Support System (OSS), a Home Subscription System (HSS) or the like.

Figure 3:
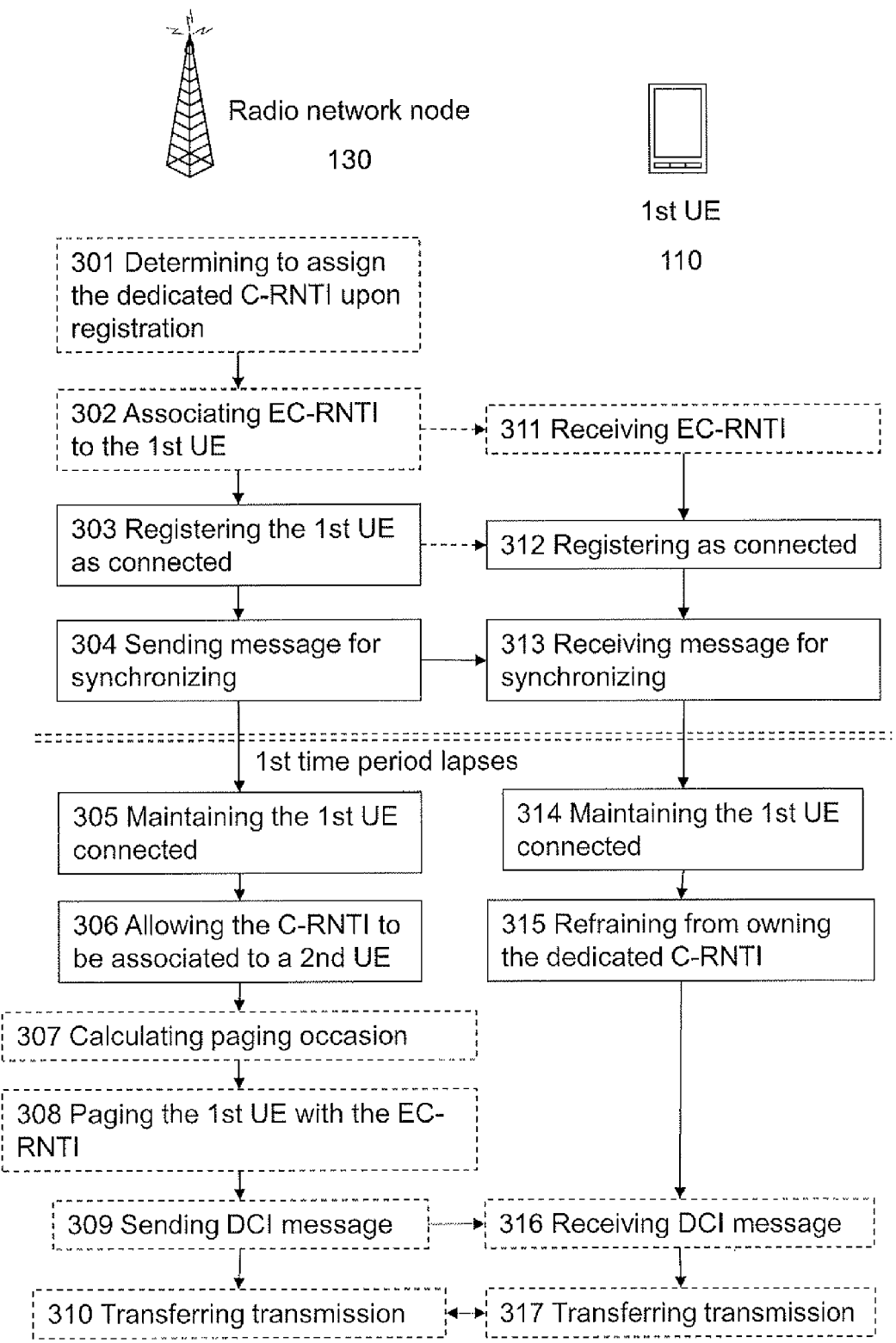
FIG. 3 shows a schematic, combined signaling scheme and flowchart of the exemplifying methods performed in the radio communication system according to FIG. 1.

For granting UL resources, the situation is somewhat different this will be dealt with after the description of FIG. 3.

Now turning to FIG. 3, a combined signaling scheme and flowchart of an exemplifying method for assigning a short-lived C-RNTI to the first user equipment 110 performing random access to the radio network node 130, when implemented in the radio communication system 100 of FIG. 1, is shown.

The following actions may be performed. Notably, in some embodiments of the method the order of the actions may differ from what is indicated below and/or in the Figure unless otherwise noted. For example, action 303 may in some embodiments be performed after action 313.

Action 301

The short-lived C-RNTI will not always be used, therefore some way of determining when to use the short-lived C-RNTI may be needed in some embodiments.

Hence, before registering the first user equipment 110 as connected to the radio network node 130 by assigning the short-lived C-RNTI to the first user equipment 110, see Action 303 and Action 312, the radio communication system 100 may determine to assign the short-lived C-RNTI to the first user equipment 110 upon the registration of the first user equipment 110 as connected. The determining is based on one or more of:

(1) number of available C-RNTIs;
(2) a category of the first user equipment 110, wherein the category is obtained from one or more of the first user equipment, subscription information and collected statistics about transmissions; and
(3) data about transmissions between the first user equipment 110 and the radio network node 130 and/or one or more other radio network nodes, wherein the data about transmission is obtained from one or more of subscription information and collected statistics about transmissions. The data about transmissions, such as statistics thereof, may be collected over longer time periods, i.e.

over multiple attachment sessions, and since the first user equipment 110 may move in the meantime, the statistics may in principle include communication with any radio network node, typically eNodeB or base station, in the radio communication system 100.

As an example relating to (1), the radio network node, such as radio network node in LTE, assigns regular, i.e. not dedicated or short-lived, C-RNTIs to user equipments as long as there are many regular C-RNTIs left. But if there seems to be a risk that the 16-bit C-RNTI space is depleted, the radio network node starts assigning short-lived C-RNTIs. By use of a timeout value, such as the first time period, that depends on the number of unused C-RNTIs, the radio network node may choose to make the transition from assignment of long-lived C-RNTIs to assignment of short-lived C-RNTIs gradual.

In another example relating to (2), the first time period, sometimes referred to as a short-lived C-RNTI timeout value, is user equipment specific. Hence, the radio network node signals it to the user equipment explicitly when the short-lived C-RNTI is assigned. In this way, different categories of user equipments, or types of user equipments, could be separated, and a shorter C-RNTI lifetime assigned to user equipments which anyway are expected to have short data transaction. Categories of user equipments may for instance be different types of MTC devices, supporting different MTC applications. Information about the category of user equipment may be obtained from subscription data, e.g. from the HSS via the MME using a Subscriber Profile Identifier (SPID), which is transferred to the radio network node in the "Subscriber Profile ID for RAT/Frequency priority" information element in the S1AP INITIAL CONTEXT SETUP REQUEST message, or from user equipment category/capabilities received from the user equipment itself.

Another example relating to (3) is to make the determining of whether or not to use short-lived C-RNTIs adaptive via learning. For instance, the radio network node or nodes in the core network, e.g. the SGW/PGW and/or the MME, may measure the activity of the device. This measurement data, or a derived suitable timeout value, could then be stored in the HSS (or possibly some other database), so that the next time the UE connects to the network, it automatically gets a suitably adapted timeout value from the start.

Typically, the radio network node 130 performs the determination described above.

Action 302 and 311

According to some embodiments, the first extended C-RNTI is used for identification of the first user equipment 110. Therefore the first extended C-RNTI needs to be associated, or assigned, and transferred to the first user equipment 110. In order to make both the radio network node 130 and the first user equipment 110 aware of the first extended C-RNTI Action 302 is performed.

Before the first time period has elapsed, the radio network node 130 may associate a first extended C-RNTI to the first user equipment 110. As mentioned above, the first extended C-RNTI comprises a first set of bits and a second set of bits. The number of bits of the first set is equal to the number of bits of the short-lived C-RNTI. As an example, the first extended C-RNTI is stored in the radio network node 130. Moreover, the first extended C-RNTI may be sent, by the radio network node 130, to the first user equipment 110, which stores the first extended C-RNTI.

Before the first time period has elapsed is meant to indicate that the action 302 is required to be performed when the first user equipment still may be identified by the short-lived C-RNTI. Hence, as long as the user equipment listens to the short-lived C-RNTI, the radio network node 130 may send a message to the first user equipment 110 in order to associate the first extended C-RNTI to the first user equipment 110.

It may be preferred that this action is performed in conjunction with the assignment (as described in action 303 and 312 below) of the short-lived C-RNTI as part of the random access procedure. See for example action 400 in FIG. 4 and action 600 in FIG. 6. Hence, it is only in some embodiments that a separate message for the association of the first extended C-RNTI is used.

Action 303 and Action 312

The radio communication system 100 registers the first user equipment 110 as connected to the radio network node 130. The short-lived C-RNTI is assigned to the first user equipment 110 for identification thereof during the first time period.

This action is part of the random access procedure. The random access procedure is generally known in the art and may include establishment of a connection, or association, between a user equipment and a radio network node, such as a base station or eNB, wherein the connection is a radio based connection, such as a Radio Resource Control (RRC) connection in LTE. In these actions, however, the short-lived C-RNTI is used for identification. The use of the short-lived C-RNTI implies for the user equipment 110 that certain actions may need to be performed. For example, if a predetermined value of the first time period is used, the user equipment 110 does no longer consider the short-lived C-RNTI to be owned by it, if the first user equipment 110 is inactive for a duration being equal to (or greater than) the first time period.

Thus, as an example, when the radio network node 130 registers the first user equipment 110 as connected to the radio network node 130, an RRC connection is established. A context (or UE context), in the form of information about the UE 110, is stored in the radio network node 130. Furthermore, radio transmission resources for uplink signalling may be allocated to the user equipment 110.

As an example relating to LTE, the radio network node 130 may send a RRCConnectionSetup message to the first user equipment 110 in response to a RRCConnectionRequest message sent by the first user equipment 110. Next, the radio network node 130 may receive a RRCConnectionComplete message from the first user equipment 110 when the connection has been established.

Action 304 and Action 313

Within the radio communication system 100, a message for synchronizing the radio network node 130 and the first user equipment 110 with respect to the first time period is transferred from the radio network node 130 to the first user equipment 110. The synchronization may be triggered, or performed in response to, the assignment of the short-lived C-RNTI in action 303 and 312.

As mentioned above, the first user equipment 110 may manage a first timer and the radio network node 130 may manage a second timer. As an example, the first user equipment 110 and the radio network node 130 starts the first and second timer, respectively, for keeping track of the first time period, in response to and based on the message for synchronization.

In some examples, the radio network node 130 immediately assigns the first extended C-RNTI without simultaneously assigning, or previously having assigned a short-lived C-RNTI to the first user equipment 110. These examples may be seen as a special case of the method illustrated in FIG. 3 with a first time period that is equal to zero. Thus, for such examples, the Action 304 and Action 313 are not required and/or not essential for the implementation.

The message for synchronizing the radio network node 130 and the first user equipment 110 with respect to the first time period may be the same as a message used to assign the extended C-RNTI to the first user equipment and/or a message used for triggering registration of the first user equipment as connected in conjunction with actions 302, 311, 303 and 312. Thus, in FIG. 3 arrows between action 302 and 311 as well as action 303 and 312 are shown with dashed-lines.

In some preferred embodiments, a modified RRCConnectionSetup message is defined. The modified RRCConnectionSetup message may handle:
 synchronization of the radio network node 130 and the first user equipment 110 with respect to the first time period (as in actions 304 and 313),
 association of the EC-RNTI to the first user equipment 110 (as in actions 302 and 311), and
 functionality as is known in the art for establishment of a connection, such as RRC connection establishment in LTE.

More generally, such modified RRCConnectionSetup message, may be referred to as a message for establishing a connection such as to connect the first user equipment to the radio network node. The message for establishing the connection may handle all (or part) of the information to be transferred (from the radio network node 130 to the first user equipment 110) in conjunction with actions 302, 311, 303, 312, 304 and 313. Here, as mentioned above, the information relates to synchronization of the radio network node 130 and the first user equipment 110 with respect to the first time period, the association of the extended C-RNTI to the first user equipment 110 and regular information for establishing a connection.

Action 305 and Action 314

After the first time period has elapsed, the radio communication system 100 maintains the first user equipment 110 connected to the radio network node 130.

As an example, the radio network node 130 considers the first user equipment 110 to be in RCC_CONNECTED mode, albeit the first user equipment 110 no longer is an exclusive owner of the short-lived C-RNTI. Hence, special actions as described by embodiments herein for identification of the first user equipment are required. As an example, the first user equipment 110 is in the C-RNTI-less connected mode as described above. Again, a special definition, in addition to for example RRC_CONNECT and RRC_IDLE, for the C-RNTI-less connected mode is not required (but may in some examples nevertheless be implemented). Instead, the C-RNTI-less connected mode may be detected by for example observing the expiry of the first time period.

As an example, the user equipment is now aware of that special actions as described by embodiments herein for reception or transmission of a transmission are required.

Action 306

The radio communication system 100, in particular the radio network node 130, allows the short-lived C-RNTI to be assigned to a second user equipment 120, thereby enabling use of the short-lived C-RNTI for identification of the second user equipment 120 when connected to the radio network node 130. In this manner, the short-lived C-RNTI may be de-allocated.

Expressed somewhat differently, the short-lived C-RNTI is implicitly released, i.e. no release command is sent to the first user equipment 110. Such release command, such as RRCConnectionRelase in LTE, would normally force the first user equipment to enter RRC_IDLE mode. This is not the case here, since as mentioned above, the first user equipment remains connected, such as in RRC_CONNECTED mode, to the radio network node 130. In more detail, the user equipment may be in RRC_CONNECTED mode while observing that the first time period has elapsed, i.e. the first user equipment 110 may be in the C-RNTI-less connected mode.

Action 307

In order for the radio network node 130 to be able to page the first user equipment in action 308, the radio network node 130 may calculate a paging occasion based on the first extended C-RNTI. As a detailed example, the radio network node 130 may in this manner obtain a so called UE Identity Index, such as the UE Identity Index that would normally be calculated by the core network as IMSI mod 1024, and a Paging DRX for the first user equipment 110. These are used for calculation of a paging frame and the paging occasion, respectively.

As an example, the radio network node 130 may calculate the paging occasions for pages which are not initiated by the core network similarly as in prior art, but with the IMSI replaced by another identifier, such as the extended C-RNTI. See action 302, in which the radio network node 130 may assign the extended C-RNTI to the first user equipment 110. The DRX value used for this type of paging may be a well-known constant, or broadcast in the system information, or be explicitly assigned to the terminal. It is also possible to reuse the DRX setting for regular paging that is already broadcast in the system information.

In other examples, the core network node, such as an MME, transfers the UE Identity Index value and the Paging DRX to the radio network node 130, e.g. together with other UE context data in the S1AP INITIAL CONTEXT SETUP REQUEST message. Alternatively, although less efficient, the radio network node 130 could send the other input data (i.e. other than the UE Identity Index value and the Paging DRX) that is used in the paging frame and paging occasion calculations to the MME and the MME performs the calculations and returns the result. In this manner, the radio network node 130 could send the input data in the S1AP INITIAL UE MESSAGE message to the MME and the MME could return the calculation result in the S1AP INITIAL CONTEXT SETUP REQUEST message.

Action 308

This action may be performed after the first time period has elapsed and before a transmission between the first user equipment 110 and the radio network node 130 is to take place. Throughout this specification, the transmission may be an uplink transmission from the first user equipment 110 to the radio network node 130 or a downlink transmission from the radio network node 130 to the first user equipment 110 if not otherwise noted or implied by the context. However, in the case where a page precedes the transmission, the transmission is typically a downlink transmission.

In this action, the radio network node 130 may initiate paging of the first user equipment 110 at the paging occasion, while using the first extended C-RNTI for identification of the first user equipment 110. It shall here be noted that paging is normally initiated by the core network node, typically a MME in case of an LTE system. Here, when the page is not initiated by the core network, the paging identity of the first user equipment 110, such as the S-TMSI (or IMSI), has been replaced by the extended C-RNTI.

The initiated paging may be performed by sending a page message to the first user equipment 110. The page message may comprise an indication of resources to be used for the transmission. The resource may be resource elements, CDMA codes or other transmission resources, which are known from 3GPP terminology. However, typically the page message does not comprise an indication of transmission resources, but instead triggers the first user equipment to initiate a random access procedure involving establishment of a connection with the radio network node, e.g. an RRC connection.

In order to make the radio network node 130 aware of the paging identity, it is also possible to let the core network node, such as an MME, transfer the S-TMSI (or IMSI) to the radio network node 130, e.g. together with other UE context data in the S1AP INITIAL CONTEXT SETUP REQUEST message. If the MME subsequently changes the S-TMSI, it would transfer the new S-TMSI to the radio network node 130, e.g. using the S1AP UE CONTEXT MODIFICATION REQUEST message.

After the page, the first user equipment 110 may perform a random access (RA) procedure to have a C-RNTI assigned in the RA response from the radio network node 130. The radio network node 130 may then assign DL transmission resources to the first user equipment 110 through regular PDCCH signaling addressed to the C-RNTI that was assigned to the first user equipment 110. If a new paging identity was used (as was mentioned as a possible option above), then the UE may also use this new identifier to identify itself during the RA procedure.

As an alternative or complement to how to proceed after the page, the radio network node 130 may, as mentioned above, assign the DL transmission resources ("indication of transmission resources" above) to the first user equipment 130 already in the Page message (thus requiring new parameters in the page message). Here, no C-RNTI assignment is needed, although this may be assigned in the page message as well (requiring further extensions of the page message), e.g. in anticipation of subsequent UL (or DL) transmissions which may follow soon after the first DL transmission.

Hence, in some embodiments, the page message further comprises information about a C-RNTI to be assigned to the first user equipment 110, whereby the C-RNTI is usable for identification of the first user equipment 110 in the transmission. It may here be said that the C-RNTI is a normal or regular C-RNTI, which is known in the art. In this manner, the page message is used for assigning the C-RNTI to the first user equipment 110. The assigned C-RNTI is then used as is known in the art.

Action 309 and 316

This action is performed after the first time period has elapsed and before a transmission, uplink as well as downlink, between the first user equipment 110 and the radio network node 130 is to take place.

The radio communication system 100 may transfer, from the radio network node 130 to the first user equipment 110, a dedicated downlink control information message, "DCI message", encoded with the first extended C-RNTI, for assigning resources for the transmission. As is known in the art, the DCI message may be used for carrying uplink grants and downlink assignments by means of different DCI formats. Here, the first set of bits is added to the CRC of the DCI message.

However, since the EC-RNTI is longer than the 16-bit C-RNTI (and thus longer than the 16-bit CRC), new DCI formats may be introduced. By defining a new DCI format, comprising a field for the second set of bits, the DCI message may, according to some embodiments, comprise DCI information according to such a new format. Thus, the field comprises the second set of bits.

DCI formats are distinguished based on their differing sizes (except for DCI formats 0 and 1A which have the same size and are distinguished through a format 0/1A indicator), so the existing DCI formats need not be impacted by the introduction of new ones with different sizes. Thus an "EC-RNTI addressing variant" of each of the existing DCI formats would be needed, if full DL control signaling functionality is to be provided to user equipments addressed with extended C-RNTIs. However, possibly some advanced functionality, such as scheduling for multiple transmission layers, may be omitted, as the primary target of the extended C-RNTI addressing scheme may be MTC devices, which typically are assumed to be simple, low-cost devices with simple transmission requirements. If for instance scheduling for multiple transmission layers is not needed, then no special variant of DCI format 2 is needed.

In a further example, the DCI message is sent on PDCCH resources, which are dedicated on a per frame basis to be used for PDCCH signalling using addressing (i.e. identification of the user equipment that is the intended receiver of the signalling) based on an extended C-RNTI, and in a frame selected such that a number of bits of a system frame number of the frame is indicative of the second set of bits. In LTE, the frame may be a radio frame.

When the radio network node 130 sends the DCI message on these dedicated PDCCH resources, the C-RNTI encoded in the CRC, which correspond to the first set of bits of the EC-RNTI, should be extended by e.g. the 8 least significant bits of the System Frame Number (SFN) to yield the EC-RNTI of the addressed first user equipment 110. Such dedicated PDCCH resources may be assigned with regular intervals. If an interval of e.g. one radio frame (=10 ms in LTE) is used, then it would take 256 frames (=2.56 seconds) to allow addressing of any EC-RNTI and thus any user equipment, or any MTC device, without C-RNTI. For many applications this provides sufficiently frequently occurring possibilities for transmission of the DCI message. Any interval based on an integer number of radio frames (i.e. N×10 ms in LTE) would also work, with less resources assigned, but also worse performance for the concerned user equipments, the larger the value of N. When N becomes larger a time interval between possible transmissions of the DCI message also increases.

As an example, the bits of the system frame number indicating the second set of bits of the first extended C-RNTI are the least significant bits of the system frame number. In another arbitrary example, it may be a set of bits neighbouring to the three least significant bits. The number three may be replaced for any integer number. However, it may be preferred to use bits in the vicinity of the least significant bits since these vary more than other more significant bits.

The frame may comprise a first and a second set of subframes. The dedicated PDCCH resources are allocated to the first or second sets of subframes. The first and second sets of subframes are indicative of zero and one, respectively, for at least one bit of the second set of bits.

In this manner, the cycle time is reduced from 2.56 seconds by not relying solely on the SFN to provide the extension bits for completion of the EC-RNTI of the addressed first user equipment 110, but to also use the subframes. With this variation dedicated PDCCH resources would be assigned multiple times, e.g. twice, every frame. Assuming dedicated PDCCH resources allocated twice every frame (e.g. in two subframes), 7 of the extension bits would be taken from the 7 least significant bits of the SFN, while the remaining extension bit would be indicated by the subframe used for the dedicated PDCCH resources (e.g. 0 for the first of the two subframes and 1 for the second one). This would reduce the "EC-RNTI cycle time" from 2.56 to 1.28 seconds. Instead of using two single subframes one could also use two groups of subframes (e.g. with two subframes in each group) in a frame and associate bit value 0 with the first group and bit value 1 with the second group. Variations of the 7+1 extension bit division, e.g. 6+2 or 5+3, to get even shorter "EC-RNTI cycle times" are also possible, depending on how fast "EC-RNTI cycling" that is required (which may depend on the applications that prevail) and on how much of the PDCCH resources the operator wishes (or can accept) to dedicate for EC-RNTI addressing. A possible option is that the extension bit division between SFN and subframe indications (8+0, 7+1, 6+2 or 5+3) could be indicated in the System Information as well as exactly which subframe(s) in each frame that is(are) dedicated.

According to a further example, the PDCCH resources may be restricted to certain frequencies, such as subcarriers in case of LTE OFDM. For instance, a certain number of the least significant bits of the SFN could be complemented by bits indicated by the frequency range (i.e. OFDM subcarrier(s)) used for the dedicated PDCCH resource.

In further examples, a combination of one or more of SFN, subframe(s) and subcarrier(s) for providing the second set of bits may be implemented.

In some embodiments, the DCI message is sent on resources comprised in a dedicated search space for indicating the second set of bits. In this manner, the second set of bits of the EC-RNTI (i.e. the bits exceeding the 16 bits of a regular C-RNTI) are indicated by user equipment specific search spaces (i.e. indicate the set of CCE configurations that the first user equipment 110 has to blindly decode to check for PDCCH signaling addressed to it). When detecting PDCCH signaling in such an EC-RNTI derived search space, the first user equipment 110 with the allocated first EC-RNTI would know that if the set of bits corresponding to the C-RNTI that can be derived from this signalling (according to regular PDCCH addressing principles) matches the first set of bits, e.g. the 16 least significant bits, of the EC-RNTI, then the signaling is addressed to the first user equipment 110.

According to some examples, the EC-RNTI derived search spaces are used together with PDCCH resources that are dedicated for user equipments with allocated EC-RNTIs.

According to some examples, the EC-RNTI derived search spaces are used when there are no PDCCH resources that are dedicated for user equipments with allocated EC-RNTIs.

In the former example the PDCCH resources, which are dedicated for user equipments using EC-RNTIs, may be extracted from the total set of (primarily PDCCH) resources in basically any conceivable manner, e.g. defined as certain time slots (e.g. certain subframes), frequency resources (e.g. certain subcarriers) or a combination thereof (e.g. certain resource blocks). Among the resources dedicated for PDCCH signaling to user equipments with allocated EC-RNTIs the additional bits of the EC-RNTI must point out different search spaces, so that no user equipments which share the same address bits (i.e. the first set of bits, e.g. the 16 least significant bits of the EC-RNTI) get identical search spaces. Ideally these non-identical search spaces should be non-overlapping to allow as efficient scheduling as possible. However, although designing such an algorithm that can handle the most realistic cases, e.g. where the number of user equipments remains at a level where only a handful or so user equipments have to share the same 16 address bits (i.e. the values of the bits of the first set of bits of their respective EC-RNTIs are the same), seems quite feasible, achieving non-overlapping search spaces in the general case may be non-trivial (and maybe even impossible depending on the relation between the number of user equipments sharing the same 16 address bits and the available PDCCH resources) and thus in practice overlapping (albeit non-identical) search spaces may have to be accepted. With overlapping search spaces the radio network node 130 may only use the parts of the search spaces that are indeed user equipment specific, i.e. which do not overlap with the search space of any other user equipments sharing the same 16 address bits (which hence limits the flexibility of the scheduling as well as the resource utilization efficiency).

There are also other ways of dealing with the overlapping search spaces, which do not require that overlapping parts of the search spaces are avoided. For instance, the first user equipment 110 may use the dedicated search space in dedicated periods only. Hence, user equipments with identical address bits, i.e. the first set of bits, and overlapping search spaces are given dedicated time slots, in which only one user equipment at a time use its search space. The dedicated periods may be determined based on one or more of:

the second set of bits and a system frame number of the dedicated period. In this manner, a time sharing algorithm is provided. The algorithm for such a time sharing scheme could e.g. be based on the 8 additional EC-RNTI bits, i.e. the second set of bits, in combination with the SFN and/or subframe number. The algorithm, or a set of algorithms, for this could be standardized. If a set of algorithms are used, the one to use could be indicated in the broadcast system information (SI) or signaled to the UE through dedicated RRC signaling. A problem with this approach is that the number of user equipments which have to take turn on using their respective search spaces varies and is generally unknown to the user equipments. One way of dealing with this is to assume a worst case, wherein the most extreme overlap situation that the search space algorithm can produce is always assumed. Another way could be to use different algorithms for different numbers of overlaps, wherein the algorithm to use would be dynamically indicated in the SI or through dedicated RRC signaling. A complicating factor for the time sharing algorithm is that the search spaces of different user equipments may overlap each other in sequences, i.e. such that e.g. the search space of user equipment A overlaps with the search space of user equipment B, which in turn overlaps with the search space of user equipment C (which may not overlap with the search space of user equipment A) and so on. Such sequences of overlaps could require extensive time sharing to resolve, even though the overall overlap situation among the user equipments is rather mild. Hence, the search space algorithm should preferably be designed to avoid such overlap sequences.

information dynamically provided by signalling for indicating the dedicated periods. In this manner, time slot patterns, as examples of dedicated periods, may be dynamically provided. Through dedicated RRC signaling the radio network node 130 could configure each user equipment with a time slot pattern, indicating the time slots, e.g. frames or subframes, in which the user equipment may use its search space and in which time slots it may not. Such a time slot pattern would typically be that the user equipment may utilize every $N^{th}$ frame or subframe and refrain from monitoring the PDCCH the rest of the time, but more elaborate, typically repetitive, patterns are also conceivable.

DRX for the first user equipment 110 such that only the first user equipment 110 uses the dedicated search space in the dedicated periods, wherein DRX active period for the second user equipment 120 is at least partly non-overlapping, preferably completely overlapping, with DRX active period for the first user equipment 110. The radio network node 130 may coordinate the DRX configurations of user equipments with overlapping search spaces and identical address bits, such that only one of these user equipments at a time is active and able to monitor the PDCCH in its search space; and an optimistic approach. No coordinated DRX settings, time sharing patterns or algorithms are configured in the UE. Instead it is optimistically assumed that overlap conflicts will be avoided through uncoordinated DRX and uncoordinated usage of non-overlapping parts of the search spaces.

The EC-RNTI derived search spaces may be calculated using the same, or similar, algorithm as the search spaces derived from regular C-RNTIs (possibly with modifications or restrictions to limit the search spaces to the PDCCH resources that are dedicated for user equipments with allocated EC-RNTIs, if needed, depending on the way these dedicated resources are defined). The 16 bits used in the algorithm instead of the C-RNTI could then be, assuming a 24 bit EC-RNTI, the additional 8 EC-RNTI bits and the 8 most significant bits (or any other defined 8 bits) of the 16 address bits (e.g. the 16 least significant bits of the EC-RNTI). An alternative would be to replace the 8 address bits with a predefined bit sequence, e.g. all zeros which might restrict the variability of the EC-RNTI derived search spaces.

When there are no dedicated PDCCH resources for user equipments, the EC-RNTI derived search spaces may be similarly calculated. However, since PDCCH signaling to user equipments with allocated EC-RNTIs and PDCCH signaling to user equipments with regular C-RNTIs may use the same PDCCH resources in this variant, there is a further restriction on how the search spaces may be derived in order to avoid overlap conflicts: none of the search spaces calculated from EC-RNTIs which share the same 16 address bits (e.g. the 16 least significant bits) must coincide with search spaces derived from a C-RNTI consisting of these 16 bits. Overlaps may have to be accepted, but, as in the former variant, this means either that only the non-overlapping parts may be utilized or that one of the above mentioned alternative methods of dealing with the overlaps is used, which hence limits the scheduling flexibility and/or the resource utilization efficiency.

The embodiments utilising search spaces may more generally be described as that the second user equipment 120 may be connected to the radio network node 130 while being assigned a second extended C-RNTI, comprising a third and a fourth set of bits. Then, the short-lived C-RNTI is available for reuse by a further user equipment. Notably, the number of bits of the third set of bits is equal to number of bits of the short-lived C-RNTI. The first set of bits of the first extended C-RNTI are identical to the third set of bits of the second extended C-RNTI, wherein the dedicated search space for the first user equipment 110 is at least partly non-overlapping with a second dedicated search space for the second user equipment 120.

Action 310 and Action 317

The transmission, i.e. the uplink or downlink transmission, may be transferred between the radio network node 130 and the first user equipment 110.

As an example, when the transmission is a downlink transmission, the radio network node 130 sends the downlink transmission to the first user equipment 110.

As another example, when the transmission is an uplink transmission, the radio network node 130 receives the uplink transmission from the first user equipment 110.

The above description generally relates to both downlink and uplink transmissions, where examples and explanations have been limited to downlink. In the following, examples and explanations relating to UL transmissions and allocation of UL resources are provided.

For the uplink, there are two cases. A first case is when the first user equipment 110 has a valid timing advance, i.e. the first user equipment 110 is UL synchronized. A second case relates to when the first user equipment 110 does not have a valid timing advance, i.e. the first user equipment 110 lacks UL synchronization.

For the first case, it should be pointed out that, according to the preceding description with reference to FIG. 3, when the first user equipment 110 has a valid timing advance, it will typically also have a short-lived C-RNTI which has not yet timed out. As long as this situation prevails all regular mechanisms for UL transmission and allocation of UL transmission resources are available and no special solution is needed. Hence, for the first case, the methods and network nodes according to embodiments herein are needed only for the special situation when the short-lived C-RNTI times out before the timing advance, i.e. it requires that the timing advance timeout is longer than the timeout for the short-lived C-RNTI. This may be the case e.g. for user equipments which are known to be stationary and which thus are assigned very long timing advance timeout values, or even infinite timing advance timeout values. Stationary may also be that the user equipment moves very seldom.

When a user equipment in connected mode has a valid timing advance, but no C-RNTI, i.e. the user equipment is in C-RNTI-less connected mode, the user equipment assumedly has allocated PUCCH resources which it can use for requesting UL transmission resources. In more detail, a Scheduling Request may be sent by the user equipment on the allocated PUCCH resources. Triggered by the Scheduling Request the radio network node may either use EC-RNTI addressing on PDCCH (as described above) to send an UL grant to the first user equipment 110 or use the above described paging method (both variants, with DL resource assignment replaced by UL resource assignment).

The first user equipment 110 may need to perform the random access procedure due to that:
the first user equipment 110 does not have a valid timing advance,
the first user equipment 110 has no allocated PUCCH resources, but a valid timing advance, and/or
if it is deemed unnecessarily complex to use the scheme above with PUCCH followed by the EC-RNTI addressing on PDCCH or paging.

During the RA procedure the radio network node allocates UL resources to the first user equipment 110, which may or may not be enough to empty the first user equipment's 110 uplink (UL) buffer. If the allocated UL resources are not enough to empty the UL buffer, the first user equipment 110 sends another Scheduling Request in parallel with the UL data (i.e. L1/L2 signaling on the Physical Uplink Shared Channel, PUSCH). During the RA procedure the radio network node 130 may (optionally) also assign a C-RNTI (and possibly PUCCH resources) to the first user equipment 110, e.g. in anticipation of subsequent DL (or UL) transmissions which may follow soon after the first UL transmission.

It may here be noted that the short-lived C-RNTI differs from a regular C-RNTI in that the short-lived C-RNTI is exclusively owned by the first user equipment 110 during the first time period and that after the first time period has elapsed the short-lived C-RNTI is allowed to be used for identification of another user equipment while the first user equipment 110 mains connected in a special C-RNTI-less connected mode.

Figure 4:
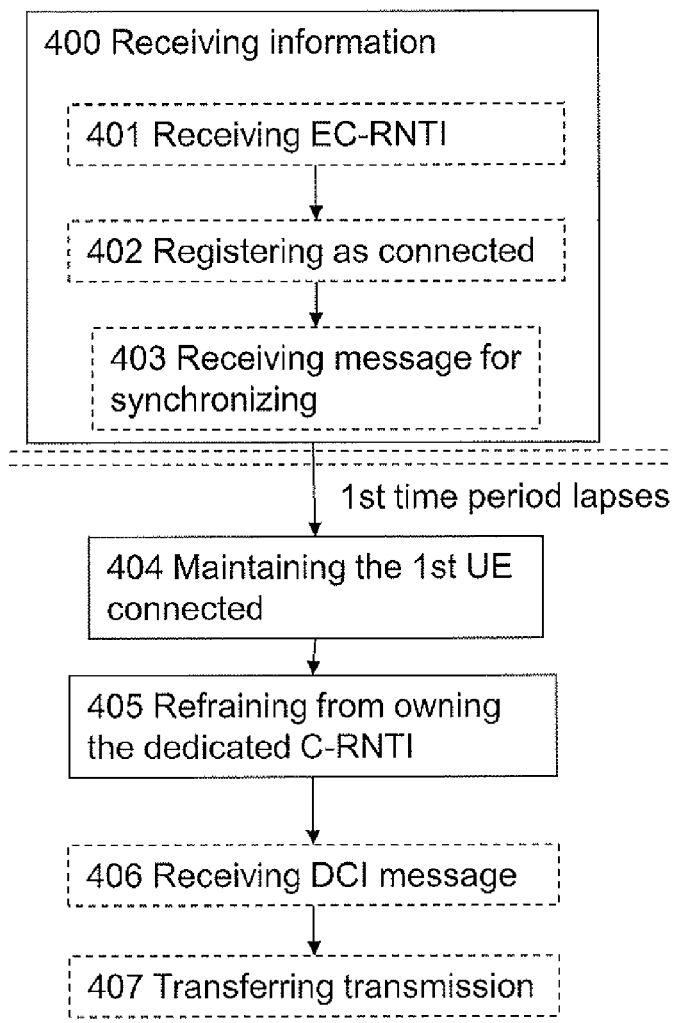
FIG. 4 shows a schematic flowchart of the methods of FIG. 3 when seen from the user equipment.

In FIG. 4, an exemplifying, schematic flowchart of the methods of FIG. 3 when seen from the first user equipment 110 is shown. The first user equipment 110 performs a method for enabling assignment of a short-lived C-RNTI to the first user equipment 110 performing random access to the radio network node 130.

The following actions are performed. Notably, in some embodiments of the method the order of the actions may differ from what is indicated below.

Action 400

The first user equipment 110 receives information relating to:
synchronization of the radio network node 130 and the first user equipment 110 with respect to the first time period, and
regular information for establishing a connection.
This action relates to action 312 and 313. Furthermore, the information may relate to association of the extended C-RNTI to the first user equipment 110. This relates to action 311. All of or part of the information may be comprised in a message for establishing a connection.

Action 400 may in some examples be realized by one or more of actions 401, 402 and 403.

Action 401

The first user equipment 110 may receive the extended C-RNTI from the radio network node 130. As mentioned, the extended C-RNTI comprises an additional number of bits compared to the short-lived C-RNTI. This action is similar to action 311.

Action 402

The first user equipment 110 may register as connected to the radio network node 130, wherein the short-lived C-RNTI is assigned to the first user equipment 110 for identification thereof during a first time period. As an example, relating to LTE, the first user equipment 110 may receive a RRCConnectionSetup message from the radio network node 130 and the first user equipment 110 may send a RRCConnectionComplete message to the radio network node 130. This action is similar to action 312.

Action 403

The first user equipment 110 may receive, from the radio network node 130, a message for synchronizing the radio network node 130 and the first user equipment 110 with respect to the first time period.

After the first time period has elapsed, the following actions may be performed: action 404, 405, 406 and 407.

Action 404

The first user equipment 110 maintains connected to the radio network node 130. This action is similar to action 314.

Action 405

The first user equipment 110 refrains from considering the short-lived C-RNIT as assigned to the user equipment 110, thereby enabling use of the short-lived C-RNTI for identification of the second user equipment 120 when connected to the radio network node 130. This action is similar to action 315.

In some embodiments, the method further comprises, before a transmission between the first user equipment 110 and the radio network node 130 and after the first time period has elapsed: receiving, from the radio network node 130, at a paging occasion for paging initiated by the radio network node 130, a page message including the extended C-RNTI for identification of the first user equipment 110.

The page message may further comprise information about a normal/regular C-RNTI to be assigned to the first user equipment 110, whereby the C-RNTI is usable for identification of the first user equipment 110 in the transmission.

The transmission may be an uplink transmission from the first user equipment 110 towards the radio network node 130 or a downlink transmission from the radio network node 130 towards the first user equipment 110.

Action 406

The first user equipment 110 may receive, from the radio network node 130, a dedicated downlink control information message, "DCI message", encoded with the extended C-RNTI, for assigning resources for the transmission, before a transmission between the first user equipment 110 and the radio network node 130 and after the first time period has elapsed.

The DCI message may comprise DCI information including a field comprising the additional number of bits of the extended C-RNTI.

The DCI message may be sent on resources, which are dedicated on a per frame basis to the extended C-RNTI, for identification of the extended C-RNTI and in a frame selected such that a number of least significant bits of a system frame number of the frame is indicative of the additional bits of the extended C-RNTI.

The frame may comprise a first and a second set of subframes, wherein the resources are allocated to the first or second sets of subframes, wherein the first and second sets of subframes are indicative of zero and one, respectively, for at least one bit of the additional bits of the extended C-RNTI.

The DCI message may be is sent on resources comprised in a dedicated search space for indicating the additional bits of the extended C-RNTI.

In some embodiments, the second user equipment 120 is connected to the radio network node 130 while being assigned a second extended C-RNTI and the short-lived C-RNTI is available for reuse by a further user equipment, wherein a number of most significant bits of the first and second extended C-RNTI are identical, wherein the dedicated search space for the first user equipment 110 is non-overlapping with a second dedicated search space for the second user equipment 120.

In some embodiments, the first user equipment 110 uses the dedicated search space in dedicated periods only, wherein the dedicated periods are determined based on one or more of:

the additional bits and a system frame number of the dedicated period;

dynamically provided by signaling for indicating the dedicated periods;

DRX for the first user equipment 110 such that only the first user equipment 110 uses the dedicated search space in the dedicated periods, wherein DRX for the second user equipment 120 is non-overlapping with DRX for the first user equipment 110.

Action 407

The first user equipment 110 may send or receive the transmission as determined by the preceding actions. This action is similar to action 317.

Figure 5:
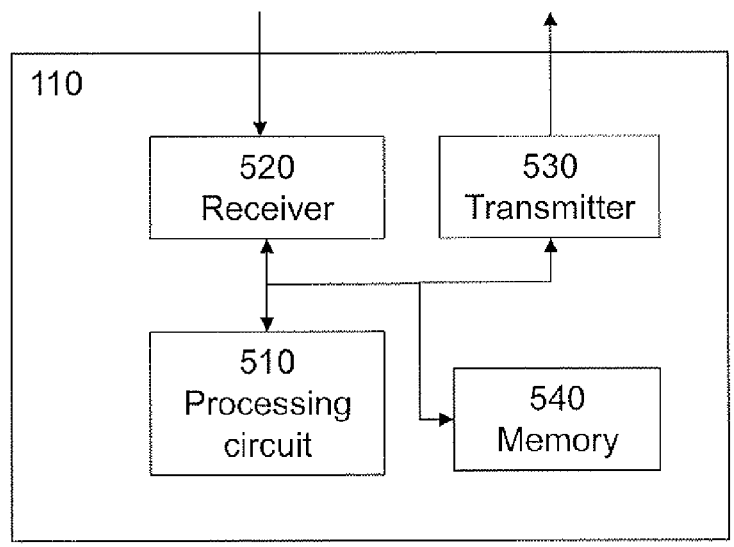
FIG. 5 shows a schematic block diagram of an exemplifying radio network node configured to perform the methods illustrated in FIG. 4.

With reference to FIG. 5, a schematic block diagram of the first user equipment 110 is shown. The first user equipment is configured to perform the methods in FIG. 4. The first user equipment 110 is configured to enable assignment of a short-lived C-RNTI to the first user equipment 110 performing random access to a radio network node 130.

The first user equipment 110 comprises a processing circuit 510 adapted to register the first user equipment 110 as connected to the radio network node 130, wherein the short-lived C-RNTI is assignable to the first user equipment 110 for identification thereof during a first time period.

The processing circuit 510 is further adapted to:

maintain the first user equipment 110 connected to the radio network node 130 after the first time period has elapsed; and refrain from considering the short-lived C-RNIT as assigned to the user equipment 110 after the first time period has elapsed, thereby enabling use of the short-lived C-RNTI for identification of the second user equipment 120 when connected to the radio network node 130.

The processing circuit 510 may be a processing unit, a processor, an application specific integrated circuit (ASIC), a field-programmable gate array (FPGA) or the like. As an example, a processor, an ASIC, an FPGA or the like may comprise one or more processor kernels.

The first user equipment 110 comprises a receiver 520 adapted to receive, from the radio network node 130, a message for synchronizing the radio network node 130 and the first user equipment 110 with respect to the first time period.

According to embodiments herein, the first user equipment 110 may be adapted to perform one or more of the actions described in conjunction with FIGS. 3 and/or 4.

The first user equipment 110 further comprises a transmitter 530, which according to embodiments herein may be configured to send the transmission to the radio network node 130.

The first user equipment 110 further comprises a memory 540 for storing software to be executed by, for example, the processing circuit. The software may comprise instructions to enable the processing circuit to perform the method in the first user equipment 110 as described above in conjunction with FIGS. 3 and/or 4. The memory 540 may be a hard disk, a magnetic storage medium, a portable computer diskette or disc, flash memory, random access memory (RAM) or the like. Furthermore, the memory may be an internal register memory of a processor.

Figure 6:
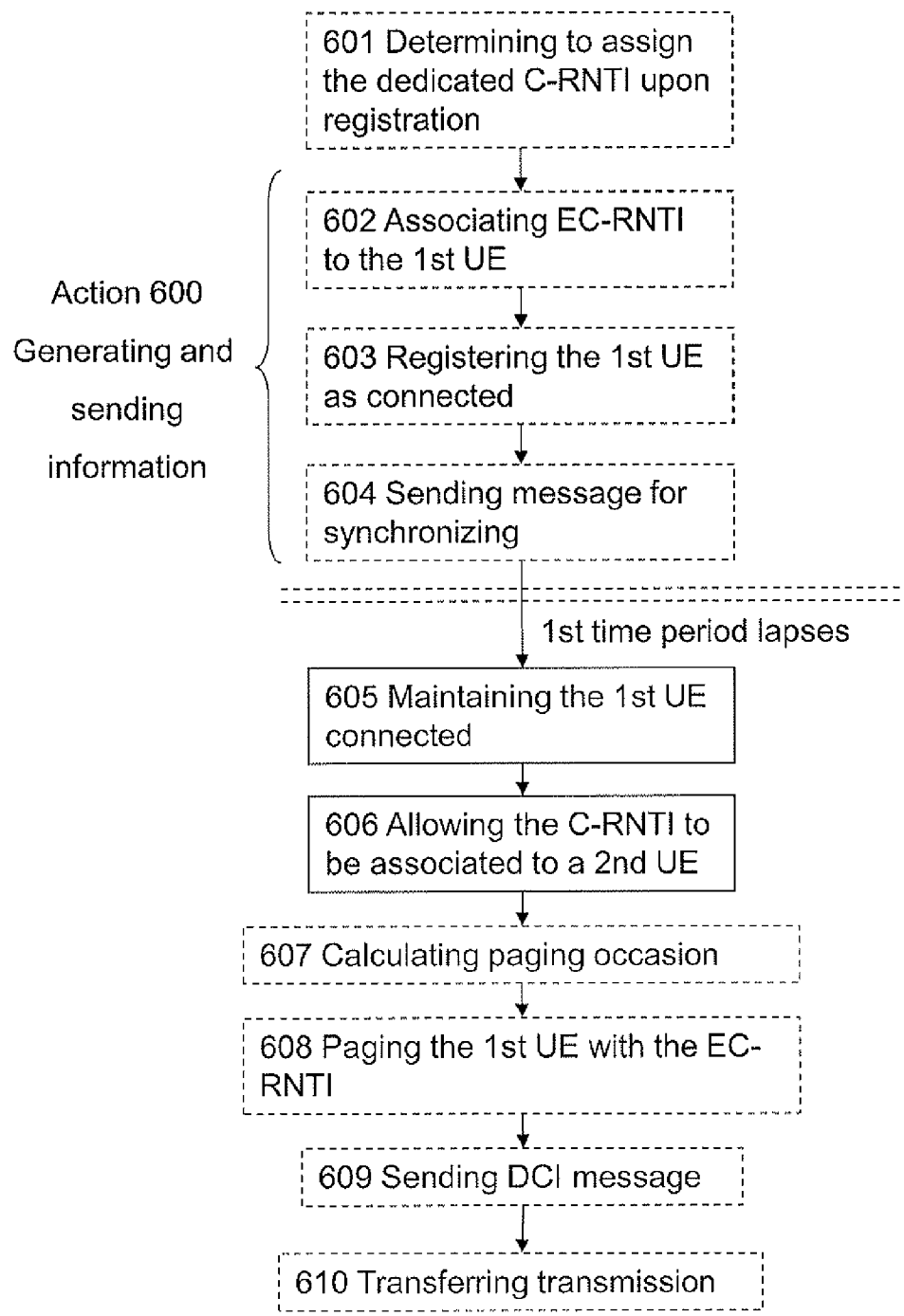
FIG. 6 shows a schematic flowchart of the methods of FIG. 3 when seen from the radio network node.

In FIG. 6, an exemplifying, schematic flowchart of the methods of FIG. 3 when seen from the radio network node 130 is shown. The radio network node 130 performs a method for assigning a short-lived C-RNTI to a first user equipment 110 performing random access to the radio network node 130.

The following actions are performed. Notably, in some embodiments of the method the order of the actions may differ from what is indicated below.

Action 600

The radio network node 130 generates and sends information relating to:

synchronization of the radio network node 130 and the first user equipment 110 with respect to the first time period, and regular information for establishing a connection.

This action relates to action 304 and 303. Furthermore, the information may relate to association of the extended C-RNTI to the first user equipment 110. This relates to action 302. All of or part of the information may be comprised in a message for establishing a connection.

Action 600 may in some examples be realized by one or more of actions 602, 603 and 604.

Action 601

The radio network node 130 may determine to assign the short-lived C-RNTI to the first user equipment 110 upon the registration of the first user equipment 110 as connected. The determining may be based on one or more of:

(1) number of available C-RNTIs;
(2) a category of the first user equipment 110, wherein the category is obtained from one or more of the first user equipment, subscription information and collected statistics about transmissions; and
(3) data about transmissions between the first user equipment 110 and the radio network node 130 and/or one or more other radio network nodes, wherein the data about transmission is obtained from one or more of subscription information and collected statistics about transmissions. The data about transmissions, such as statistics thereof, may be collected over longer time periods, i.e. over multiple attachment sessions, and since the first user equipment 110 may move in the meantime, the statistics may in principle include communication with any radio network node, typically eNodeB or base station, in the radio communication system 100.

This action is similar to action 301.

Action 602

The radio network node 130 may associate an extended C-RNTI to the first user equipment 110. The extended C-RNTI comprises an additional number of bits compared to the short-lived C-RNTI. It is preferred that this action is performed before the first time period has elapsed. This action is similar to action 302.

Action 603

The radio network node 130 may register the first user equipment 110 as connected to the radio network node 130. In this manner, the short-lived C-RNTI is assigned to the first user equipment 110 for identification thereof during a first time period. This action is similar to action 303.

Action 604

The radio network node 130 sends, to the first user equipment 110, a message for synchronizing the radio network node 130 and the first user equipment 110 with respect to the first time period.

As an example, this message may be a modified RRC-ConnectionSetup message as mentioned above.

This action is similar to action 304.

After the first time period has elapsed, the following actions may be performed: action 605, 606, 607, 608, 609 and 610.

Action 605

The radio network node 130 maintains the first user equipment 110 connected to the radio network node 130. This action is similar to action 305.

Action 606

The radio network node 130 allows the short-lived C-RNTI to be assigned to a second user equipment 120, thereby enabling use of the short-lived C-RNTI for identification of the second user equipment 120 when connected to the radio network node 130. This action is similar to action 306.

Action 607

The radio network node 130 may calculate the paging occasion based on the extended C-RNTI. This action is similar to action 307.

Action 608

This action may be performed after the first time period has elapsed and before a transmission between the first user equipment 110 and the radio network node 130 is to take place. As mentioned, the transmission may be an uplink transmission from the first user equipment 110 towards the radio network node 130 or a downlink transmission from the radio network node 130 towards the first user equipment 110.

The radio network node 130 may page at a paging occasion the first user equipment 110 while using the extended C-RNTI for identification of the first user equipment 110. This action is similar to action 308.

The paging may comprise sending of a page message to the first user equipment 110, wherein the page message comprises an indication of resources to be used for the transmission.

The page message may further comprise information about a normal/regular C-RNTI to be assigned to the first user equipment 110, whereby the C-RNTI is usable for identification of the first user equipment 110 in the transmission.

Action 609

Before a transmission between the first user equipment 110 and the radio network node 130 and after the first time period has elapsed, the radio network node 130 may send, to the first user equipment 110, a dedicated downlink control information message, "DCI message", encoded with the extended C-RNTI, for assigning resources for the transmission. This action is similar to action 309.

The DCI message may comprise DCI information including a field comprising the additional number of bits of the extended C-RNTI.

The DCI message may be sent on resources, which are dedicated on a per frame basis to the extended C-RNTI, for identification of the extended C-RNTI and in a frame selected such that a number of least significant bits of a system frame number of the frame is indicative of the additional bits of the extended C-RNTI.

The frame may comprise a first and a second set of subframes, wherein the resources are allocated to the first or second sets of subframes, wherein the first and second sets of subframes are indicative of zero and one, respectively, for at least one bit of the additional bits of the extended C-RNTI.

The DCI message may be sent on resources comprised in a dedicated search space for indicating the additional bits of the extended C-RNTI.

In some embodiments, the second user equipment 120 is connected to the radio network node 130 while being assigned a second extended C-RNTI and the short-lived C-RNTI is available for reuse by a further user equipment, wherein a number of most significant bits of the first and second extended C-RNTI are identical, wherein the dedicated search space for the first user equipment 110 is non-overlapping with a second dedicated search space for the second user equipment 120.

In some embodiments, the dedicated search space is dedicated to dedicated periods only, wherein the dedicated periods are determined based on one or more of:

the additional bits and a system frame number of the dedicated period;

dynamically provided by signaling for indicating the dedicated periods;

DRX for the first user equipment 110 such that only the first user equipment 110 uses the dedicated search space in the dedicated periods, wherein DRX for the second user equipment 120 is non-overlapping with DRX for the first user equipment 110.

In some embodiments, the dedicated periods further are determined based on the additional bits, a system frame number of the dedicated period and the short-lived C-RNTI. Action 610

The radio network node 130 may send or receive the transmission to/from the first user equipment 110. This action is similar to action 310.

Figure 7:
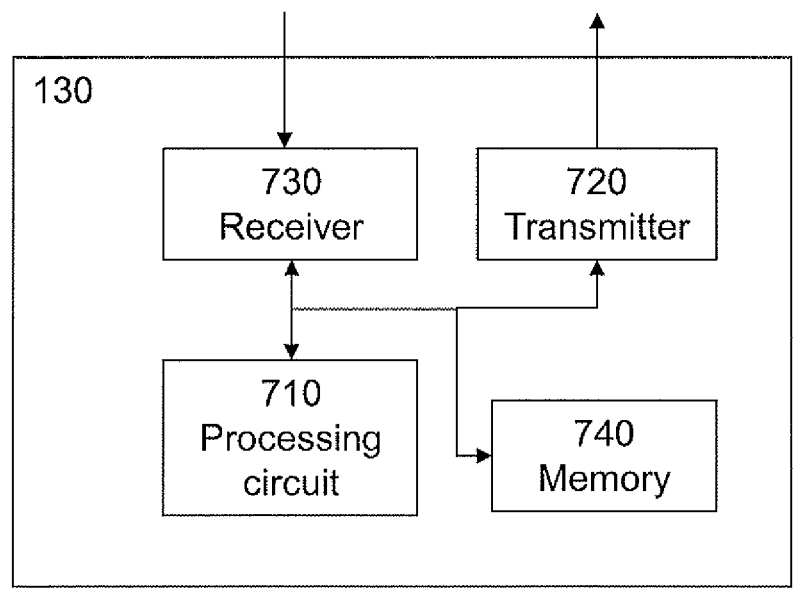
FIG. 7 shows a schematic block diagram of an exemplifying user equipment configured to perform the methods illustrated in FIG. 6.

With reference to FIG. 7, a schematic block diagram of the radio network node 130 is shown. The radio network node 130 is configured to perform the methods in FIG. 6. The radio network node 130 is configure to assign a short-lived C-RNTI to a first user equipment 110 performing random access to the radio network node 130.

The radio network node 130 comprises a processing circuit 710 adapted to register the first user equipment 110 as connected to the radio network node 130, wherein the short-lived C-RNTI is assignable to the first user equipment 110 for identification thereof during a first time period. The processing circuit 710 is further adapted to:

maintain the first user equipment 110 connected to the radio network node 130 after the first time period has elapsed, and allow the short-lived C-RNTI to be assigned to a second user equipment 120 after the first time period has elapsed, thereby enabling use of the short-lived C-RNTI for identification of the second user equipment 120 when connected to the radio network node 130.

The processing circuit 710 may be a processing unit, a processor, an application specific integrated circuit (ASIC), a field-programmable gate array (FPGA) or the like. As an example, a processor, an ASIC, an FPGA or the like may comprise one or more processor kernels.

The radio network node 130 further comprises a transmitter 720 adapted to send, to the first user equipment 110, a message for synchronizing the radio network node 130 and the first user equipment 110 with respect to the first time period.

According to embodiments herein, the radio network node 130 may be adapted to perform one or more of the actions described in conjunction with FIGS. 3 and/or 6.

The radio network node 130 further comprises a receiver 730, which according to embodiments herein may be configured to receive the transmission from the first user equipment 110.

The radio network node 110 further comprises a memory 740 for storing software to be executed by, for example, the processing circuit. The software may comprise instructions to enable the processing circuit to perform the method in the radio network node 130 as described above in conjunction with FIGS. 3 and/or 6. The memory 740 may be a hard disk, a magnetic storage medium, a portable computer diskette or disc, flash memory, random access memory (RAM) or the like. Furthermore, the memory may be an internal register memory of a processor.

Even though embodiments of the various aspects have been described, many different alterations, modifications and the like thereof will become apparent for those skilled in the art. The described embodiments are therefore not intended to limit the scope of the present disclosure.

The invention claimed is:

1. A method in a radio communication system for assigning a short-lived Cell Radio Network Temporary Identifier (C-RNTI) to a first user equipment performing random access to a radio network node, the method comprising:

registering the first user equipment as connected to the radio network node, wherein the short-lived C-RNTI is assigned to the first user equipment for identification thereof during a first time period;

transferring, from the radio network node to the first user equipment, a message for synchronizing the radio network node and the first user equipment with respect to the first time period, wherein the first time period is indicative of time elapsed since a last dedicated transmission between the first user equipment and the radio network node;

determining that the first time period has elapsed; and in response to the determining that the first time period has elapsed:

maintaining the first user equipment connected to the radio network node, wherein the maintaining comprises the first user equipment continuously remaining connected to the radio network node; and assigning the short-lived C-RNTI to a second user equipment while the first user equipment is connected to the radio network node;

during the first time period and prior to the first time period elapsing, assigning, by the radio network node, a first extended C-RNTI to the first user equipment for identification during signaling on a Physical Downlink Control Channel (PDCCH), wherein the first extended C-RNTI comprises a greater total number of bits than a total number of bits of the short-lived C-RNTI; and paging, after the first time period has elapsed, initiated by the radio network node, the first user equipment, at a paging occasion, using the first extended C-RNTI for identification of the first user equipment.

2. The method according to claim 1, wherein the first extended C-RNTI comprises a first set of bits and a second set of bits, wherein a number of bits of the first set is equal to the total number of bits of the short-lived C-RNTI.

3. The method according to claim 1, further comprising: calculating the paging occasion based on the first extended C-RNTI.

4. The method according to claim 1, wherein the paging comprises sending a page message to the first user equipment, wherein the page message comprises an indication of resources to be used for the transmission.

5. The method according to claim 4, wherein the page message further comprises information about a C-RNTI to be assigned to the first user equipment, whereby the C-RNTI is usable for identification of the first user equipment in the transmission.

6. The method according to claim 1, further comprising, before a transmission between the first user equipment and the radio network node and after the first time period has elapsed:

transferring, from the radio network node to the first user equipment, a dedicated downlink control information message (DCI message) encoded with the first extended C-RNTI, for assigning resources for the transmission.

7. The method according to claim 6, wherein the DCI message comprises DCI information including a field comprising the second set of bits.

8. The method according to claim 6, wherein the DCI message is sent on Physical Downlink Control Channel (PDCCH) resources, which are dedicated on a per frame basis to the first extended C-RNTI, for identification of the first extended C-RNTI and in a frame selected such that a number of bits of a system frame number of the frame is indicative of the second set of bits.

9. The method according to claim 8,
wherein the frame comprises a first set of subframes and a second set of subframes, and
wherein the PDCCH resources are allocated to the first set of subframes indicating a value of zero for at least one bit of the second set of bits or to the second set of subframes indicating a value of one for at least one bit of the second set of bits.

10. The method according to claim 6, wherein the DCI message is sent on resources comprised in a dedicated search space for indicating the second set of bits.

11. The method according to claim 10, wherein the second user equipment is connected to the radio network node while being assigned a second extended C-RNTI, comprising a third and a fourth set of bits, and the short-lived C-RNTI is available for reuse by a further user equipment, wherein a number of bits of the third set of bits is equal to the total number of bits of the short-lived C-RNTI, wherein the first set of bits of the first extended C-RNTI are identical to the third set of bits of the second extended C-RNTI, wherein the dedicated search space for the first user equipment is at least partly non-overlapping with a second dedicated search space for the second user equipment.

12. The method according to claim 11, wherein the first user equipment uses the dedicated search space in dedicated periods only, wherein the dedicated periods are determined based on one or more of:
the second set of bits and a system frame number of the dedicated period;
information dynamically provided by signalling for indicating the dedicated periods; and
DRX for the first user equipment such that only the first user equipment uses the dedicated search space in the dedicated periods, wherein DRX active period for the second user equipment is at least partly non-overlapping with DRX active period for the first user equipment.

13. The method according to claim 1, wherein the transmission is an uplink transmission from the first user equipment to the radio network node or a downlink transmission from the radio network node to the first user equipment.

14. The method according to claim 1, further comprising, before registering the first user equipment as connected to the radio network node by assigning the short-lived C-RNTI to the first user equipment:
determining to assign the short-lived C-RNTI to the first user equipment upon the registration of the first user equipment as connected, wherein the determining is based on one or more of:
number of available C-RNTIs;
a category of the first user equipment, wherein the category is obtained from one or more of the first user equipment, subscription information and collected statistics about transmissions, and
data about transmissions between the first user equipment and the radio network node and/or one or more other radio network nodes, wherein the data about transmission is obtained from one or more of subscription information and collected statistics about transmissions.

15. The method according to claim 1,
wherein the maintaining the first user equipment connected to the radio network node comprises maintaining the first user equipment in an RRC_CONNECTED state.

16. The method according to claim 1, further comprising:
performing, by the first user equipment, the random access to the radio network node, responsive to the first user equipment not having a valid timing advance.

17. The method according to claim 1, further comprising:
performing, by the first user equipment, the random access to the radio network node, responsive to the first user equipment not having allocated Physical Uplink Control Channel (PUCCH) resources, but having a valid timing advance.

18. The method according to claim 17, further comprising:
using the first extended C-RNTI for identification of the first user equipment during the performing the random access,
wherein the using the first extended C-RNTI for identification of the first user equipment during the performing the random access is done in a message responsive to a Random Access Response message from the radio network node, and
wherein the message uses allocated Physical Uplink Shared Channel (PUSCH) transmission resources.

19. The method according to claim 1, further comprising:
transmitting, by the first user equipment, a random access preamble message to the network node;
receiving, from the network node, a Random Access Response message responsive to the random access preamble message, wherein the Random Access Response message allocates uplink transmission resources for transmission of a subsequent message from the first user equipment; and
transmitting, by the first user equipment, a message using the allocated uplink transmission resources, the message comprising the first extended C-RNTI,
wherein the first extended C-RNTI is used for identification of the first user equipment during the performing of the random access.

20. A first user equipment for enabling assignment of a short-lived Cell Radio Network Temporary Identifier (C-RNTI) to the first user equipment performing random access to a radio network node, wherein the first user equipment comprises:
a processing circuit configured to perform operations comprising:
registering the first user equipment as connected to the radio network node, wherein the short-lived C-RNTI is assignable to the first user equipment for identification thereof during a first time period,
maintaining the first user equipment connected to the radio network node in response to determining that the first time period has elapsed, wherein the first user equipment continuously remains connected to the radio network node; and
refraining from considering the short-lived C-RNTI as assigned to the first user equipment after the first time period has elapsed while the first user equipment is connected to the radio network node; and
a receiver configured to perform operations comprising:
receiving, from the radio network node, a message for synchronizing the radio network node and the first user equipment with respect to the first time period, wherein the first time period is indicative of time elapsed since a last dedicated transmission between the first user equipment and the radio network node; and
receiving a paging initiated by the radio network node after the first time period has elapsed, at a paging occasion, using a first extended C-RNTI for identification of the first user equipment during signaling on a Physical Downlink Control Channel (PDCCH),
wherein the first extended C-RNTI comprises a greater total number of bits than a total number of bits of the short-lived C-RNTI, and
wherein the first extended C-RNTI was assigned to the first user equipment by the radio network node during the first time period before the first time period elapsed.

21. The first user equipment according to claim 20, wherein the first extended C-RNTI comprises a first set of bits and a second set of bits, wherein a number of bits of the first set is equal to the total number of bits of the short-lived C-RNTI.

22. A radio network node for assigning a short-lived Cell Radio Network Temporary Identifier (C-RNTI) to a first user equipment performing random access to the radio network node, wherein the radio network node comprises:
a processing circuit configured to perform operations comprising:
registering the first user equipment as connected to the radio network node, wherein the short-lived C-RNTI is assigned to the first user equipment for identification thereof during a first time period;
determining that the first time period has elapsed;
in response to the determining that the first time period has elapsed:
maintaining the first user equipment connected to the radio network node after the first time period has elapsed, wherein the maintaining comprises the first user equipment continuously remaining connected to the radio network node, and
assigning the short-lived C-RNTI to a second user equipment after the first time period has elapsed while the first user equipment is connected to the radio network node; and
during the first time period and prior to the first time period elapsing, assigning, by the radio network node, a first extended C-RNTI to the first user equipment for identification during signaling on a Physical Downlink Control Channel (PDCCH), wherein the first extended C-RNTI comprises a greater total number of bits than a total number of bits of the short-lived C-RNTI; and
paging, after the first time period has elapsed, initiated by the radio network node, the first user equipment, at a paging occasion, using the first extended C-RNTI for identification of the first user equipment;
a transmitter configured to perform operations comprising:
sending, to the first user equipment, a message for synchronizing the radio network node and the first user equipment with respect to the first time period,
wherein the first time period is indicative of time elapsed since a last dedicated transmission between the first user equipment and the radio network node.

23. The radio network node according to claim 22, wherein the first extended C-RNTI comprises a first set of bits and a second set of bits, wherein a number of bits of the first set is equal to the total number of bits of the short-lived C-RNTI.

24. A radio communication system for assigning a short-lived Cell Radio Network Temporary Identifier (C-RNTI) to a first user equipment performing random access to a radio network node, wherein the radio communication system comprises:
a first user equipment for enabling assignment of a short-lived Cell Radio Network Temporary Identifier (C-RNTI) to the first user equipment performing random access to a radio network node, wherein the first user equipment comprises:
a processing circuit configured to perform operations comprising:
registering the first user equipment as connected to the radio network node, wherein the short-lived C-RNTI is assigned to the first user equipment for identification thereof during a first time period;
determining that the first time period has elapsed;
in response to the determining that the first time period has elapsed:
maintaining the first user equipment connected to the radio network node after the first time period has elapsed, wherein the maintaining comprises the first user equipment continuously remaining connected to the radio network node; and
refraining from considering the short-lived C-RNTI as assigned to the first user equipment after the first time period has elapsed while the first user equipment is connected to the radio network node; and
a receiver configured to receive, from the radio network node, a message for synchronizing the radio network node and the first user equipment with respect to the first time period; and
the radio network node for assigning the short-lived C-RNTI to the first user equipment performing random access to the radio network node, wherein the radio network node comprises:
a processing circuit configured to perform operations comprising:
registering the first user equipment as connected to the radio network node, wherein the short-lived C-RNTI is assigned to the first user equipment for identification thereof during the first time period;
maintaining the first user equipment connected to the radio network node after the first time period has elapsed,
assigning the short-lived C-RNTI to the second user equipment after the first time period has elapsed while the first user equipment is connected to the radio network node;
during the first time period and prior to the first time period elapsing, assigning by the radio network node, a first extended C-RNTI to the first user equipment for identification during signaling on a Physical Downlink Control Channel (PDCCH), wherein the first extended C-RNTI comprises a greater total number of bits than a total number of bits of the short-lived C-RNTI; and
paging, after the first time period has elapsed, initiated by the radio network node, the first user equipment, at a paging occasion, using the first extended C-RNTI for identification of the first user equipment; and
a transmitter configured to perform operations comprising:
sending, to the first user equipment, the message for synchronizing the radio network node and the first user equipment with respect to the first time period,
wherein the first time period is indicative of time elapsed since a last dedicated transmission between the first user equipment and the radio network node.

* * * * *